(12) United States Patent
Park et al.

(10) Patent No.: US 7,835,568 B2
(45) Date of Patent: Nov. 16, 2010

(54) METHOD AND APPARATUS FOR IMAGE-BASED PHOTOREALISTIC 3D FACE MODELING

(75) Inventors: In-Kyu Park, Seoul (KR); Heui-Keun Choh, Seoul (KR); Vladimir Vezhnevets, Gyeonggi-do (KR); Hui Zhang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1383 days.

(21) Appl. No.: 10/927,241

(22) Filed: Aug. 27, 2004

(65) Prior Publication Data

US 2005/0063582 A1 Mar. 24, 2005

Related U.S. Application Data

(60) Provisional application No. 60/498,695, filed on Aug. 29, 2003.

(30) Foreign Application Priority Data

Aug. 16, 2004 (KR) .................. 10-2004-0064323

(51) Int. Cl.
*G06K 9/00* (2006.01)
*G06K 9/62* (2006.01)

(52) U.S. Cl. ...................... 382/154; 382/181

(58) Field of Classification Search ............ 382/154
See application file for complete search history.

(56) References Cited

U.S. PATENT DOCUMENTS

| | | | |
|---|---|---|---|
| 5,573,006 A * | 11/1996 | Shimotani et al. | 600/558 |
| 5,694,533 A * | 12/1997 | Richards et al. | 345/420 |
| 6,487,304 B1 * | 11/2002 | Szeliski | 382/107 |
| 6,664,956 B1 * | 12/2003 | Erdem | 345/419 |
| 6,895,103 B2 * | 5/2005 | Chen et al. | 382/117 |
| 2003/0053600 A1 * | 3/2003 | Schmitz et al. | 378/210 |
| 2003/0202715 A1 * | 10/2003 | Kinjo | 382/282 |
| 2004/0017938 A1 * | 1/2004 | Cooper et al. | 382/171 |
| 2004/0179719 A1 * | 9/2004 | Chen et al. | 382/118 |
| 2005/0162419 A1 * | 7/2005 | Kim et al. | 345/419 |

FOREIGN PATENT DOCUMENTS

| | | |
|---|---|---|
| WO | 02/17234 A1 | 2/2002 |
| WO | WO0217234 A1 * | 2/2002 |

OTHER PUBLICATIONS

Sarris et al. "Building Three Dimensional Head Models."*

(Continued)

*Primary Examiner*—Vu Le
*Assistant Examiner*—Michael Vanchy, Jr.
(74) *Attorney, Agent, or Firm*—Staas & Halsey LLP

(57) ABSTRACT

An apparatus and method for image-based 3D photorealistic head modeling are provided. The method for creating a 3D photorealistic head model includes: detecting frontal and profile features in input frontal and profile images; generating a 3D head model by fitting a 3D genetic model using the detected facial features; generating a realistic texture from the input frontal and profile images; and mapping the texture onto the 3D head model. In the apparatus and method, data obtained using a relatively cheap device, such as a digital camera, can be processed in an automated manner, and satisfactory results can be obtained even from imperfect input data. In other words, facial features can be extracted in an automated manner, and a robust "human-quality" face analysis algorithm is used.

53 Claims, 40 Drawing Sheets
(18 of 40 Drawing Sheet(s) Filed in Color)

OTHER PUBLICATIONS

Su et al., "An Automatic Construction of a Person's Face Model from the Person's Two Orthogonal Views".*

Notice to Submit Response (Official Action) issued by the Korean Intellectual Property Office on Jul. 3, 2006, in corresponding Korean Patent Application No. 10-2004-0064323; and English translation thereof.

Kim, Hang-Kee, et al., "*3D Face Modeling Using Feature Line Fitting*", Collection of Articles, 2000, pp. 505-507vol. 27(2), Korea Information Science Society, Korea; and English-language abstract.

Min, Kyungpil, et al., "*Image-based 3D Face Modeling*", Collection of Articles, 2003, pp. 169-171, vol. 30(1), Korea Information Science Society, Korea; and English-language abstract.

Korean Patent Office dated Jan. 26, 2006.

Korean Information Science Society, Vo. 27, No. 2, 2000 (p. 505-507).

Sarris, N., et al., "*Building Three Dimensional Head Models*", Graphical Models, Sep. 2001, pp. 333-368, vol. 63, No. 5, Elsevier Science, San Diego, CA.

Su, Ming-Shing, et al., "*An Automatic Construction of a Person's Face Model from the Person's Two Orthogonal Views*", Proceedings of the Geometric Modeling and Processing—Theory and Applications on Jul. 10-12, 2002 in Piscataway, NJ, 2002, pp. 179-186, IEEE, New York, NY.

Park, In Kyu, et al., "*Image-Based Photorealistic 3-D Face Modeling*", Proceedings of the Sixth IEEE International Conference on Automatic Face and Gesture Recognition IEEE Comput. Soc Los Alamitos, CA, 2004, pp. 49-54, IEEE, New York, NY.

Chen, Ling et al., "*Using Stereo Camera System to Realize Realistic Video Avatar in Virtual Environment*", Signal Processing, 2002 6th International Conference on Aug. 26-30, 2002 in Piscataway, NJ, Aug. 26, 2002, pp. 707-710, vol. 1, IEEE, New York, NY.

Singh, Sarbjit et al., "*Monitoring Drive Fatigue Using Facial Analysis Techniques*", Intelligent Transportation Systems, 1999. Proceedings, 1999 IEEE/IEEJ/JSAI International Conference on Tokyo, Japan Oct. 5-8, 1999 in Piscataway, NJ, pp. 314-318, IEEE, New York, NY.

* cited by examiner

METHOD AND APPARATUS FOR IMAGE-BASED PHOTOREALISTIC 3D FACE MODELING

This application claims the benefit of U.S. Provisional Patent Application No. 60/498,695, filed on Aug. 29, 2003, in the U.S. Patent and Trademark Office, and Korean Patent Application No. 2004-64323, filed on Aug. 16, 2004, the disclosures of which are incorporated herein in their entirety by reference.

BACKGROUND OF THE INVENTION

1. Field of the Invention

The present invention relates to image processing, and more particularly, to a method and apparatus for image-based photorealistic 3D face modeling.

2. Description of the Related Art

Automated photorealistic 3D face modeling is considered as a very important task in the computer graphics field due to its wide applicability in various fields such as virtual space creation, computer gaming, video conferencing and animation.

Although a laser scanner capturing an accurate 3D image from a complicated object and a distance measuring apparatus using structured light are currently available, the cost is still high and it is not easy to use them. Computer-aided interactive face modeling technologies require professional, hard labor. So, intensive efforts have been devoted to allow common PC users to more easily reconstruct more realistic human face models. In other words, it have been required to develop an algorithm that can be easily controlled by a common PC user, to enable automated construction of desirable faces from imperfect input data, which are obtained using economical imaging devices such as digital cameras.

Systems for automated face model reconstruction can be roughly divided into several categories according to the used source of 3D face shape data. Some researchers developed techniques to acquire face data from laser scanners or structured light installations. Problems arising with these techniques lie in that the apparatuses are expensive and are difficult to use.

Many efforts have been devoted to create face models from frontal and profile views. However, the strictly orthogonal relation between the two images is difficult to achieve when using a common handheld camera without a special auxiliary device, so the shape information obtained directly from different views has some confliction. This problem has not been solved yet.

Some systems rely on user-specified feature points in several images, which require labour-intensive manual procedures and much time. Among other approaches, methods utilizing optical flow and stereo methods seem to make the farthest step towards full automation of the reconstruction process, but the resulting models include considerable noise and unnaturally deformed face surface.

To avoid undesirable artifacts of the face model and increase robustness, some researchers utilize a morphable face model, which allows use of a limited number of feature points. The morphable face model is matched with reconstructed 3D points or source images and requires model-based bundle adjustment for shape recovery. These approaches greatly rely on how accurate and extensive the set of feature points is.

In another method for obtaining an accurate model using stereo reconstruction, shape recovery is limited only to a deformable model that fits additional constraints imposed, thereby degrading the accuracy of the model.

Some researchers have tried to build a model from just one frontal image based on priori information on depth. However, the resulting model quality in this case is far from being photorealistic.

An important issue in face modeling is the automated extraction of facial features. Various facial feature detection methods such as appearance-based modeling of facial features, human vision-based algorithms, search for specific edge and low-intensity pixel patterns, use of morphological operators, etc. have been suggested. Despite the obvious progress in this field, much work is still needed to improve accuracy and robustness for the creation of "human-quality" face analysis algorithms.

SUMMARY OF THE INVENTION

The present invention provides a method and apparatus for image-based photorealistic 3D face modeling using two images including frontal and profile images or three images including frontal, near-frontal, and profile images.

According to an aspect of the present invention, there is provided a method for creating a 3D photorealistic head model, the method comprising: (a) detecting frontal and profile features in input frontal and profile images; (b) generating a 3D head model by fitting a 3D genetic model using the detected facial features; (c) generating a realistic texture from the input frontal and profile images; and (d) mapping the texture onto the 3D head model.

According to specific embodiments of the present invention, the generating the 3D head model in (b) may further comprise generating depth information from the frontal image and a near-frontal image, wherein the generic model is fitted using the facial features to determine the 3D shape of the particular face, and the generated 3D head model is fitted using the depth information.

The detecting the frontal features in (a) may comprise: detecting a skin region; detecting a face region; detecting eye bounding boxes; detecting irises; normalizing the frontal image, detecting eye contours, detecting eyebrows, detecting lips contour, detecting nose contour, and detecting chin and cheeks contours.

The normalizing the frontal image may comprise rotating the frontal image such that the line between the centers of the irises becomes horizontal and resealing the frontal image to a predetermined resolution.

The detecting the profile features in (a) may comprise: detecting a profile region; detecting a profile curve; detecting fiducial points; and detecting an ear contour.

The generating the depth information from the frontal and near-frontal images may comprise: determining features points in the frontal image; performing model-based Lucas-Kanade tracking on the feature points to find corresponding points in the near-frontal image; obtaining a dense disparity map by data interpolation using matching correspondence; and converting the disparity map into the depth information. In this case, the converting the disparity map into the depth information may comprise: obtaining a difference value between maximum and minimum disparity values; determining a coefficient by dividing the difference value by a head width and multiplying the divided result by a predetermined constant; and obtaining the depth value of a pixel by multiplying the coefficient by a value obtained by subtracting the minimum disparity value from a measured disparity value.

The fitting the genetic model in (b) may comprise: converting feature curves detected in the images into 2D points corresponding to features defined in the 3D generic model using the length ratios of feature points on a facial feature curve of the 3D genetic model; and fitting the 3D generic model by 3-step radial based function (RBF)-based morphing based on the correspondences between the images features and the feature points of the 3D generic model.

The generating the realistic texture in (c) may comprise: performing color correction on the input images to compensate for different lightening conditions or color balance variations between cameras; generating frontal and profile textures by mapping the frontal and profile images onto a public UV plane based on the correspondence between 3D model vertices and projected 2D positions; and combining the frontal and profile textures and an artificial texture using a multi-resolution spline algorithm to complete texturing.

According to another aspect of the present invention, there is provided an apparatus for creating a 3D photorealistic head model, the apparatus comprising: a face feature detecting unit detecting frontal and profile features in input frontal and profile images; a face model fitting unit generating a 3D head model by fitting a 3D genetic model using the detected facial features; a texture generating unit generating a realistic texture from the input frontal and profile images; and a mapping unit mapping the texture onto the 3D head model generated in the face model fitting unit.

According to specific embodiments of the present invention, the face model fitting unit may comprise a depth information generating portion extracting depth information from the frontal image and a near-frontal image and generates the 3D head model by fitting the generic model using the facial features detected in the face feature detecting unit and the depth information generated in the depth information generating portion.

The face feature detecting unit may comprise: a frontal feature detecting portion detecting the frontal features; and a profile feature detecting portion detecting the profile features. The frontal feature detecting portion may comprise: a skin region detecting portion detecting a skin region; a face region detecting portion detecting a face region; an eye bounding boxes detecting portion detecting eye bounding boxes; an iris detecting portion detecting irises; and a frontal image normalizing potion normalizing the frontal image.

The frontal feature detecting portion further may comprise at least one of an eye contours detecting portion, an eyebrows detecting portion, a lips contour detecting portion, a nose contour detecting portion, and a chin and cheeks contour detecting portion.

The profile feature detecting portion may comprise a profile region detecting portion, a profile curve detecting portion, a fiducial point detecting portion, and an ear contour detecting portion.

The depth information generating unit may comprise; a feature point detecting portion determining feature points in the frontal image and finding corresponding feature points in the near-frontal image; a disparity obtaining portion obtaining a dense disparity map by data interpolation using matching correspondence; and a disparity-to-depth information converting portion converting the disparity map into the depth information.

The generic model fitting unit may comprise; a 2D point converting portion converting feature curves detected in the images into 2D points corresponding to features defined in the 3D genetic model using the length ratios of feature points on a facial feature curve of the 3D genetic model; and a mesh model fitting portion fitting the 3D generic model by 3-step radial based function (RBF)-based morphing based on the correspondences between the images features and the feature points of the 3D generic model.

The texture generating unit may comprise: an input image compensating portion compensating for different lightening conditions or color balance variations between cameras by performing color correction on the input images; a frontal/profile texture generating portion generating frontal and profile textures by mapping the frontal and profile images onto a public UV plane based on the correspondence between 3D model vertices and projected 2D positions; and a texturing completing portion combining the frontal and profile textures and an artificial texture using a multi-resolution spline algorithm to complete texturing.

According to another aspect of the present invention, there is provided computer readable medium having embodied thereon a computer program for the above-described image-based photorealistic 3D head modeling method.

BRIEF DESCRIPTION OF THE DRAWINGS

The application file contains at least one drawing executed in color. Copies of the color drawings are enclosed.

The above and other features and advantages of the present invention will become more apparent by describing in detail exemplary embodiments thereof with reference to the attached drawings in which.

DETAILED DESCRIPTION OF THE INVENTION

Embodiments of the present invention will be described with reference to the appended drawings.

The outline of a method and apparatus for image-based photorealistic 3D face modeling according to the present invention will be described prior to detailed descriptions thereof, i.e., regarding face feature detection, face model fitting, texture generation, and 3D reconstruction using stereo image pair.

A modeling apparatus according to the present invention utilizes two or three facial images, frontal and profile images for the two, and frontal, near-frontal, and profile images for the three, to generate a photorealistic 3D polygonal face model.

The image acquisition conditions are simple: good contrast and sharpness and sufficient illumination in a facial area.

Figure 1:
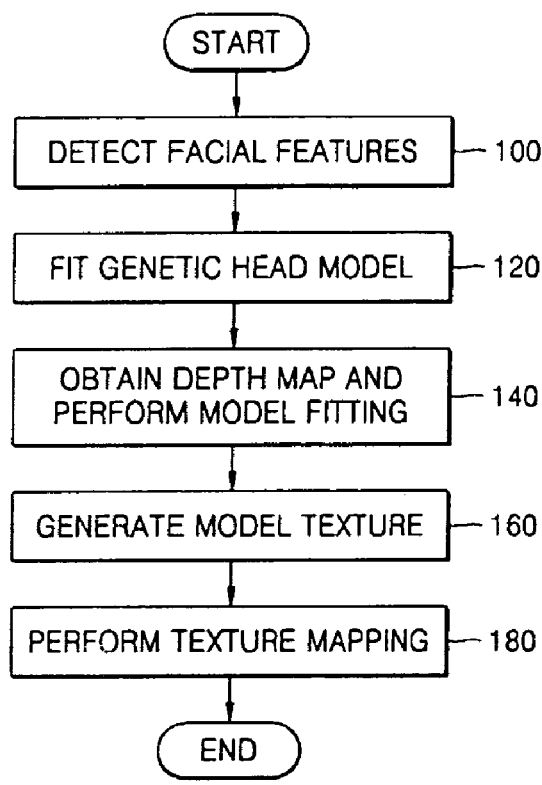
FIG. 1 is a flowchart of a method of image-based photorealistic 3D face modeling according to the present invention.
Figure 2:
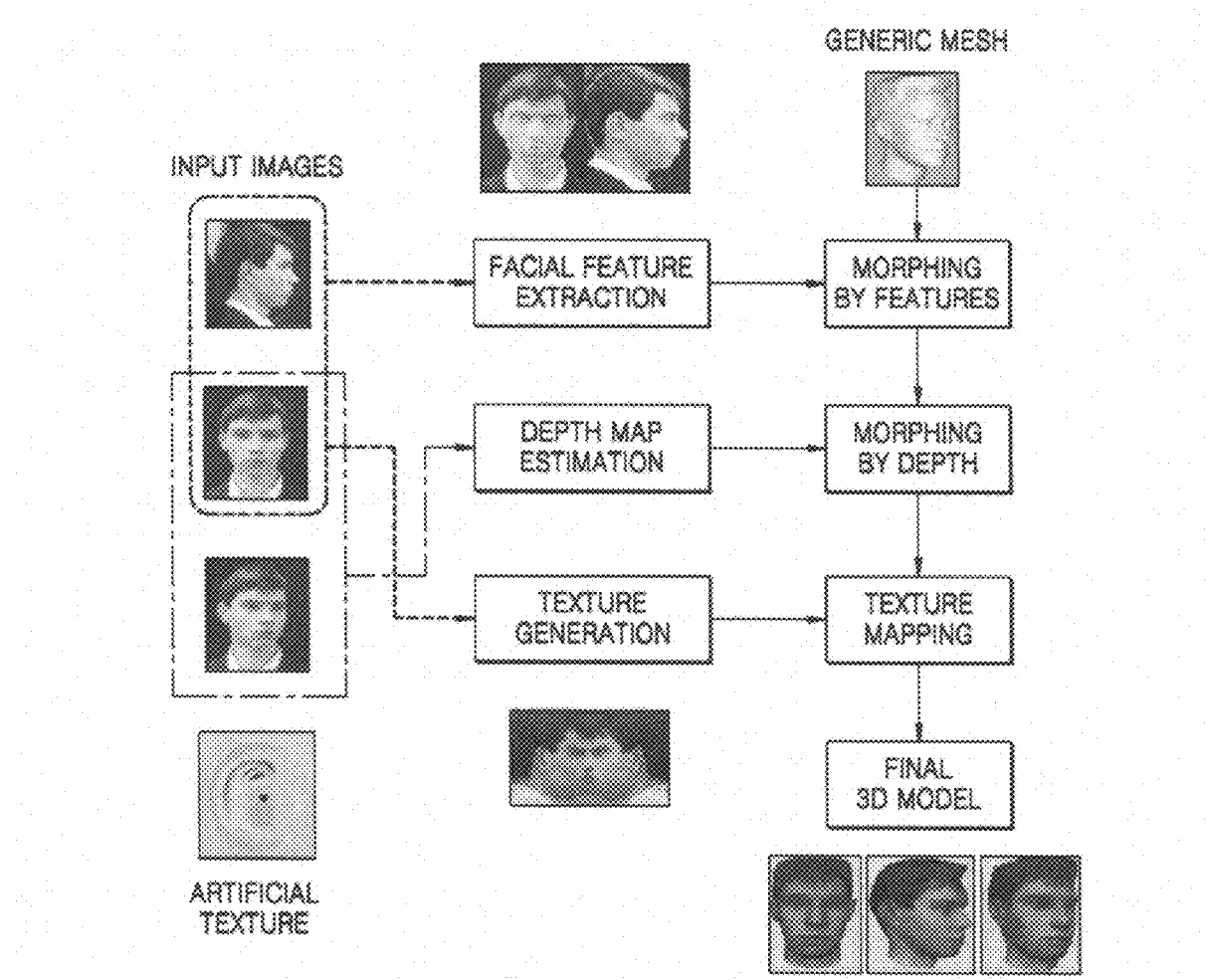
FIG. 2 illustrates a detailed modeling process along with photographs.

FIG. 1 is a flowchart of an image-based photorealistic 3D face modeling method according to the present invention. FIG. 2 illustrates a detailed modeling process along with photographs.

As shown in FIGS. 1 and 2, the modeling process includes the following operations. First, automated frontal feature detection and semi-automated profile feature detection are performed (operation 100). Secondly, a generic 3D head model (genetic mesh) is morphed to fit to frontal facial features (operation 120). Next, automated model-based stereo estimation is performed to obtain a depth map of the frontal photograph; and the model is morphed again to fit to profile features and the estimated stereo depth map (operation 140). Finally, a model texture is created from the frontal and profile photographs, along with artificial skin at some areas (operation 160). The created texture is mapped with the matched head model to generate a 3D head model (operation 180).

The use of both the depth map and profile features for model fitting seems to be redundant. However, the depth map provides abundant and detailed geometric information, which makes the final model to be seen more realistic.

If the near-frontal image is not available, processes using the near-frontal image can be omitted in the 3D face modeling method according to the present invention. Reasonable results can be obtained even in this case.

Figure 3:
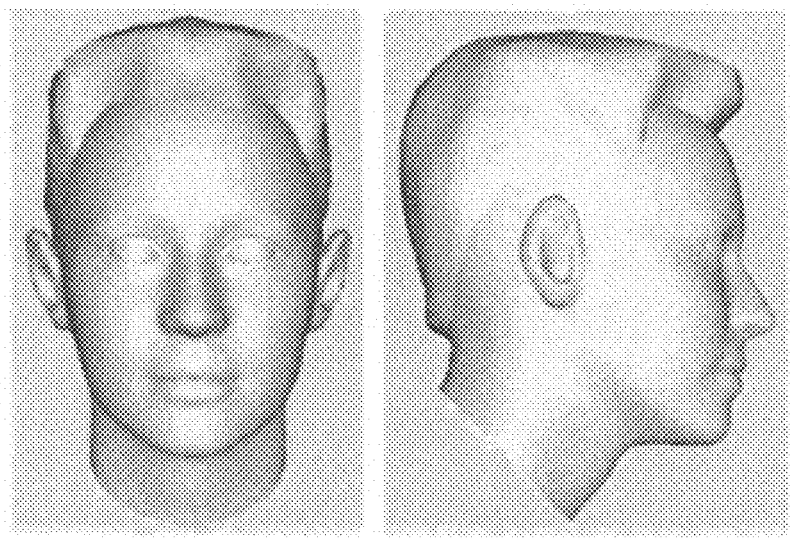
FIG. 3 illustrates frontal and profile views of a generic model.

In the 3D face modeling method according to the present invention, new models are created in a generic model fitting framework. That is, a specific face is created by fitting a generic model to the input data of the subject. The generic model, which is termed as "generic mesh" in FIG. 2, can be thought as a priori knowledge about human faces, which makes automation of the process easier and improves the robustness of the face modeling method. The generic model shown in FIG. 3 includes 7,138 vertices and 14,096 triangles not including eyeballs and hair.

Figure 4:
FIG. 4 illustrates typical input frontal, near frontal, and profile images.

The generic model is positioned in standard frontal orientation. That is, X-axis is the direction from the right to the left, Z-axis is the direction in which the eyes graze, and Y-axis is the direction from the bottom toward the top, forming a right-handed coordinate frame. Such axis directions will be used throughout the following description, provided that there is no special explanation. FIG. 4 illustrates typical frontal, near-frontal, and profile input images.

Figure 5:
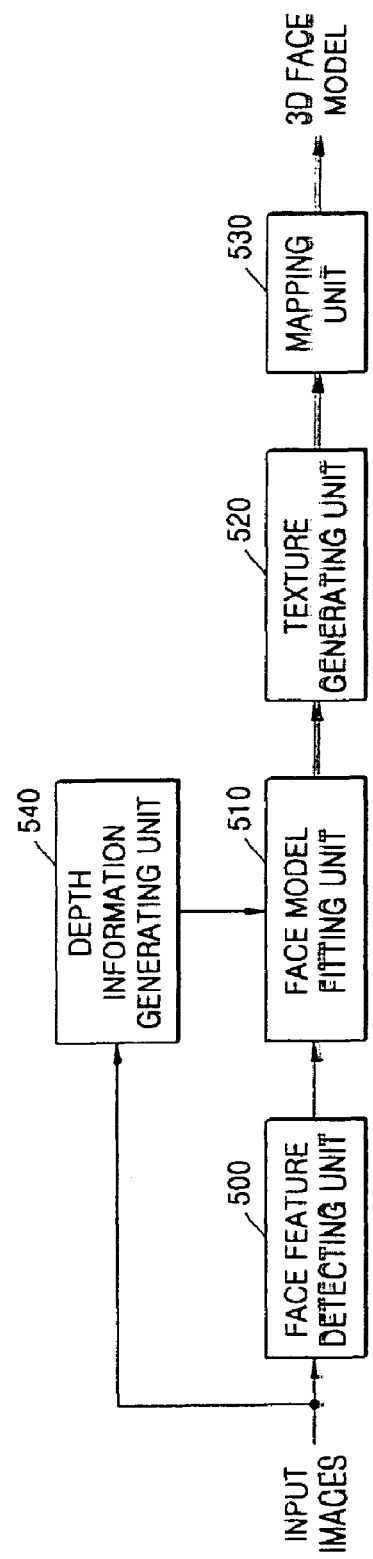
FIG. 5 is a block diagram of an apparatus for image-based photorealistic 3D face modeling according to the present invention.

FIG. 5 is a block diagram of the image-based photorealistic 3D face modeling apparatus according to the present invention. The apparatus includes a face feature detecting unit 500, a face model fitting unit 510, a texture generating unit 520, and a mapping unit 530. The apparatus may further include a depth information generating unit 540.

The face feature detecting unit 500 detects the facial features of frontal and profile input images. The face model fitting unit 510 generates a 3D face model by fitting a predetermined generic model using the detected facial features. When the depth information generating unit 540 is further included, the face model fitting unit 510 generates a 3D face model by fitting the generic model using the facial features detected in the face feature detection unit 500 and the face depth information generated by the depth information generating unit 540.

The texture generating unit 520 generates a realistic texture from the input images. The texture may be an artificial texture if needed. The mapping unit 530 maps the texture onto the 3D face model generated by the face model fitting unit 510. The depth information generating unit 540 extracts the face depth information from the frontal and near-frontal images.

1. Facial Feature Detection

Figure 6:
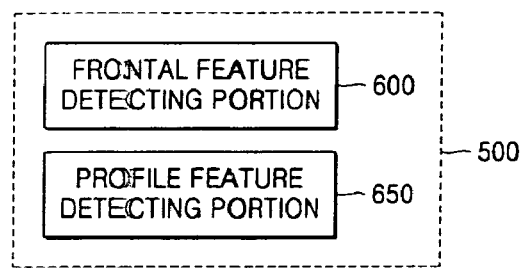
FIG. 6 illustrates a detailed configuration of a face feature detecting unit.

As shown in FIG. 6, the face feature detecting unit 500 includes a frontal feature detecting portion 600, which detects the features of the frontal face, and a profile feature detecting portion 650, which detects the features of the profile.

1.1. Frontal Feature Detection

Figure 7:
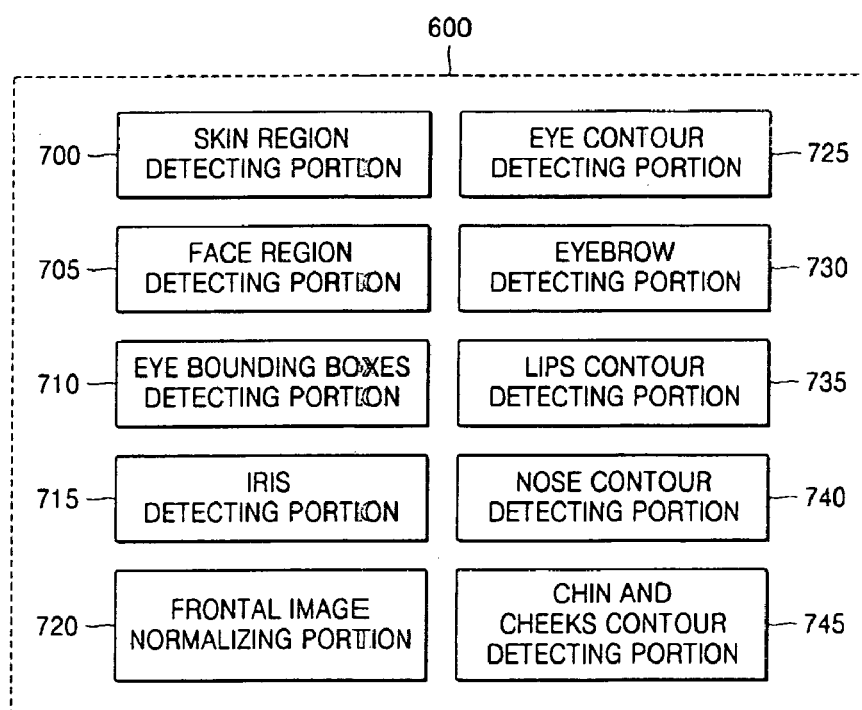
FIG. 7 illustrates a detailed configuration of a frontal feature detecting portion.

Referring to FIG. 7, the frontal feature detecting portion 600 includes a skin region detecting portion 700, a face region detecting portion 705, an eye bounding boxes detecting portion 710, an iris detecting portion 715, and a frontal image normalizing portion 720.

The frontal feature detecting unit 600 may further include at least one of an eye contour detecting portion 725, an eyebrow detecting portion 730, a lips contour detecting portion 735, a nose contour detecting portion 740, and a chin and cheeks contour detecting portion 745, if required.

Figure 8:
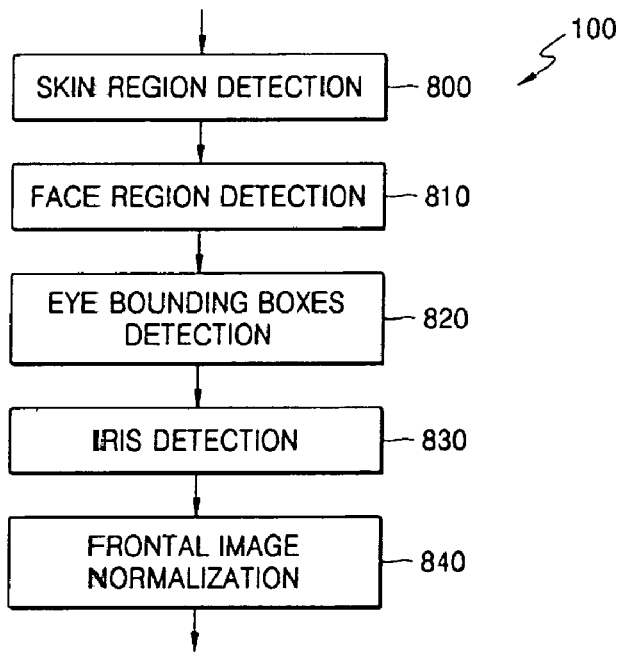
FIGS. 8 and 9 are flowcharts of detailed frontal feature detection (extraction)
Figure 9:
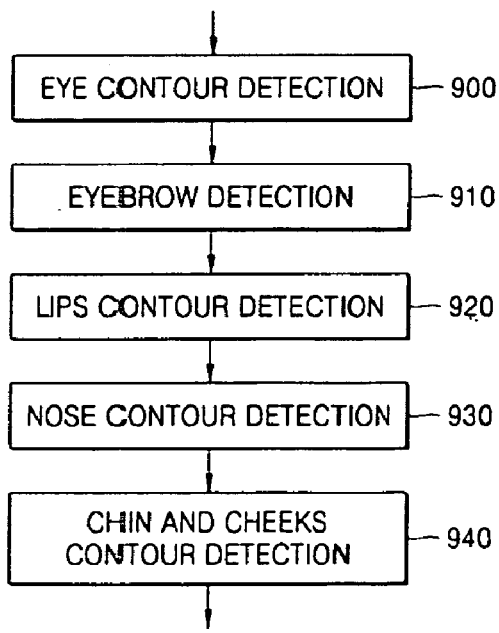

The frontal feature detection process will be described. FIGS. 8 and 9 are flowcharts of frontal feature detection (extraction). The frontal feature detection process includes skin region detection (operation 800), face region detection (operation 810), eye bounding boxes detection (operation 820), iris detection (operation 830), frontal image normalization (operation 840), eye contour detection (operation 900), eyebrow detection (operation 910), mouth (lips) contour detection (operation 920), nose contour detection (operation 930), and face (chin and cheeks) contour detection (operation 940).

Each step is performed with the assumption that the previous step has been successful and the previously detected features have reasonable accuracy. To this end, if there is inaccuracy in feature detection, a user is allowed to manually correct the feature detection inaccuracy after each step.

1.1.1. Skin Detection

A pre-trained Maximum Likelihood Bayes classifier in a normalized r-g chrominance color space is used for skin color modeling and detection. The normalized r-g color space is chosen because it allows fast and simple conversion from the RGB space, and due to known good performance of the Bayes ML classifier in skin color modeling.

The training is performed by gathering two statistics—p((r,g)|skin) and p((r,g)|¬skin), calculated using skin and non-skin histograms built from face and non-face areas of the training images. The skin likelihood image is constructed by calculating this measure for each pixel of the input frame:

$$\text{Skin}(r, g) = \frac{p((r, g) \mid \text{skin})}{p((r, g) \mid \neg \text{skin})} \qquad (1)$$

Figure 10:
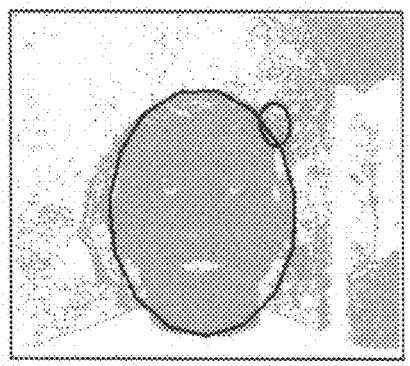
FIG. 10 illustrates an example of skin likelihood image and face region detection, in which the smaller ellipse corresponds to an initial region, and the larger ellipse corresponds to the detected result.
Figure 11:
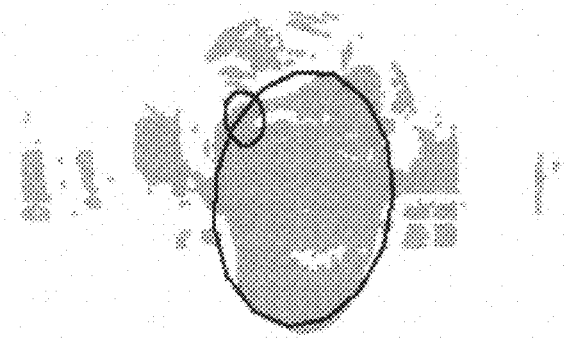
FIG. 11 illustrates another example of skin likelihood image and face region detection.

This satisfies Bayes maximum likelihood criteria with the assumption that priori skin and non-skin probabilities are equal. The resulting skin likelihood image is shown in FIGS. 10 and 11.

1.1.2. Face Region Detection

Figure 12A:
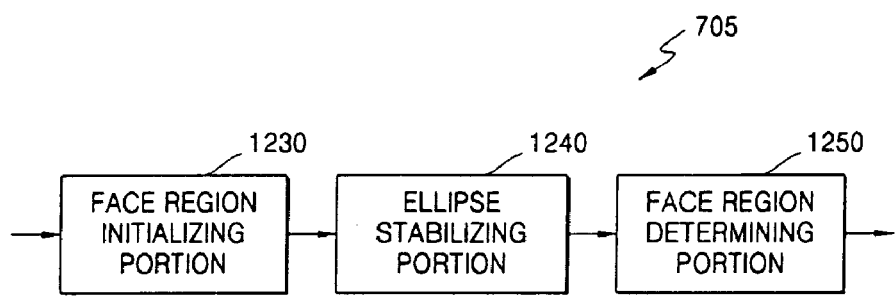
FIG. 12A is a block diagram of a face region detecting portion of FIG. 7.

FIG. 12A is a block diagram of the face region detecting portion 705 of FIG. 7. The face region detecting portion 705 includes a face region initializing portion 1230, which initializes the largest skin-colored connected component as the face region, an ellipse stabilizing portion 1240, which initializes and evolves an ellipse by displacing boundary points of the ellipse based on the initialized face region until the ellipse is stabilized, and a face region determining portion 1250, which determines a bounding box of the stabilized ellipse as the face region.

Figure 12B:
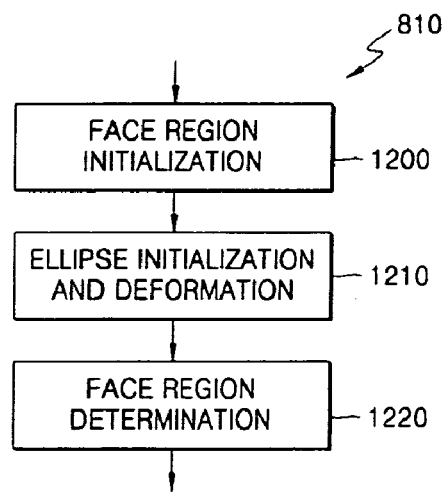
FIG. 12B is a flowchart of face region detection.
Figure 13:
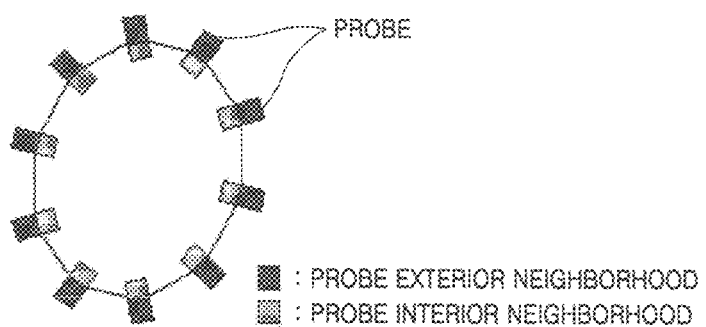
FIG. 13 illustrates an elliptical model for face region detection.

FIG. 12B is a flowchart of face region detection. According to the present invention, the face region is detected as an elliptic region and a deformable ellipse model-based technique is used. Referring to FIG. 13, an elliptic model is initialized at an expected face region (operation 1200). The expected face region can be the largest skin-colored connected component or one of the largest two components having comparable sizes that is closer to the center of the image.

Boundary points of the ellipse are displaced based on the initialized face region to initialize and evolve the ellipse to be stable (operation 1210). This operation will be described in detail.

The distribution of skin-colored pixels at the border of the ellipse and deformation of the model are controlled using a number of rectangular probes positioned on the boundary of the ellipse. The displacement of each probe is determined according to the following rules.

First, two values are calculated as follows:

$$P_{in} = 2 \cdot \frac{N_{inside}}{S}, \quad P_{out} = 2 \cdot \frac{N_{outside}}{S} \qquad (2)$$

where $N_{inside}$ is the number of skin pixels that lie both inside probe and ellipse; $N_{outside}$ is the number of skin pixels that lie inside probe and outside ellipse; and S is probe area. $P_{in}$ and $P_{out}$ have larger values if the probe lies inside the face region. $P_{in}$ and $P_{out}$ have smaller values if the probe lies outside the face region. $P_{in}$ has a larger value and $P_{out}$ has a smaller value if the ellipse lies on the boundary of the face region.

If $P_{in}<T_{in}$ ($T_{in}$ is a threshold value), the probe is moved inwards at speed $V_{in}$. Otherwise, if $P_{out}>T_{out}$ ($T_{out}$ is a threshold), the probe is moved outwards at speed $V_{out}$. That is, if there are few skin pixels inside the probe interior neighborhood, the probe exists outside the face region so that the probe moves inwards; and if the number of skin pixels both in the interior and exterior probe neighborhoods is sufficient, the probe is moved outwards.

A process of model deformation includes calculating the displacements of all probes and fitting the ellipse to the center of the repositioned probes. The ellipse is restricted to have a fixed orientation (along vertical major axis). The resultant stabilized ellipse bounding box is determined to be the face region (operation 1220).

FIGS. 10 and 11 illustrate some results from the face region detection. In FIGS. 10 and 11, the smaller ellipse corresponds to an initial region, and the larger ellipse corresponds to the detected result.

1.1.3. Eye Bounding Boxes Detection

Figure 14A:
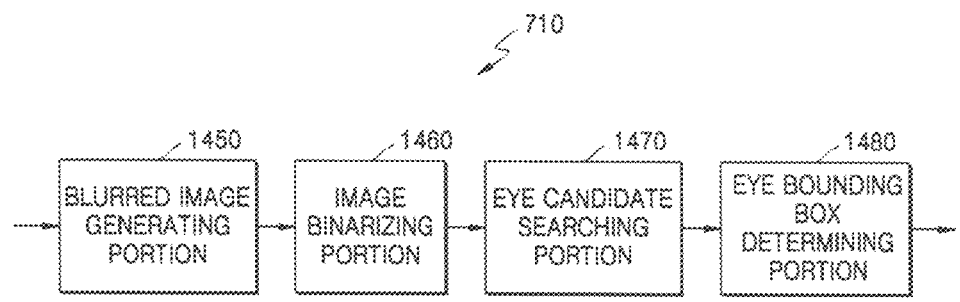
FIG. 14A is a block diagram of an eye bounding boxes detecting portion of FIG. 7.

FIG. 14A is a block diagram of the eye bounding boxes detecting portion 710 of FIG. 7. Referring to FIG. 14A, the eye bounding boxes detecting portion 710 includes a blurred image generating portion 1450, which generates a blurred image by low-pass filtering, an image binarizing portion 1460, which generates a new image by calculating the mean value of each pixel and its neighboring pixels in an image obtained by subtracting the blurred image from the original image and binarizing the new image using a predetermined threshold value, an eye candidate searching portion 1470, which finds connected segments in the image binarized in the image binarizing portion as eye candidates, and an eye bounding box determining portion 1480, which determines the eye bounding boxes by evaluating the eye candidates in terms of shape, size, and relative position.

Figure 14B:
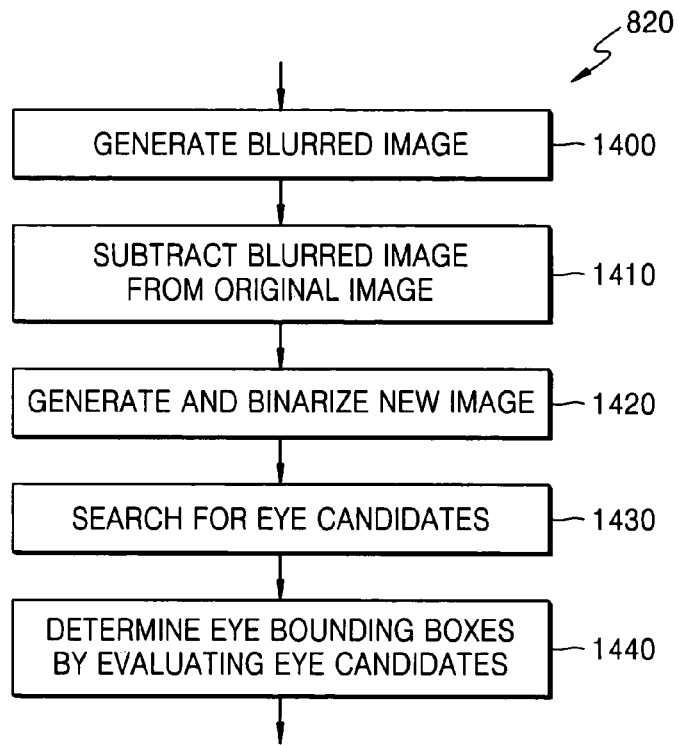
FIG. 14B is a flowchart of eye bounding boxes detection.

FIG. 14B is a flowchart of eye bounding boxes detection.

A blurred image is created by low-pass filtering (operation 1400). The blurred image is subtracted from the original image (operation 1410). The mean value of each pixel and its neighboring pixels in the resultant image is calculated. A new image is created using the mean value and binarized using a predetermined threshold value (operation 1420). Connected segments are found to be eye candidates (operation 1430). Eye bounding boxes are determined by evaluating the eye candidates in terms of shape, size, and relative position (operation 1440).

In particular, the eye bounding boxes detection in the present invention is based on the detection of approximately eye-shaped and eye-sized variations in a red channel of the color face image at several scales. The red channel is chosen because the eye irises, even in the case of light eyes (blue, green), have small red component values, while the eye whites and surrounding skin have relatively large red component values. It is experimentally proved that using the red channel gives better results than using gray level image-based methods.

First, the original R-channel image is preprocessed to preserve only a face part defined by the elliptic bounding rectangle detected in the previous process and scaled to a fixed width. The red channel intensity is also stretched to the maximum range in this step.

Second, a variation image $V_{n,\alpha}(x,y)$, which represents the likelihood that each spot is to be an eye, is calculated by the following formula:

$$V_{n,\alpha}(x, y) = \frac{1}{|R_{n,x,y}|} \sum_{r \in R_{n,x,y}} \left( I(r) - \frac{1}{|P_{n,r}|} \sum_{p \in P_{n,r}} I(p) \right)^2 * \alpha \quad (3)$$

where p and r represent pixel locations; I is a red channel image after pre-processing; $R_{n,x,y}$ is a rectangle of (n×5) size centered at (x, y); $P_{n,r}$ is an ellipse of (n×n/2) size centered at r; α is a scaling coefficient, n represents the expected size of eye features.

Figure 15:
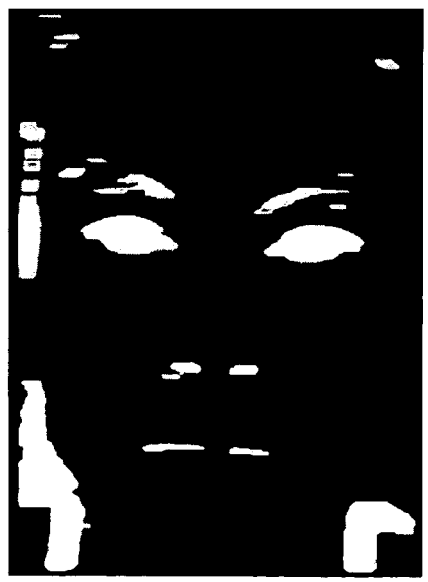
FIG. 15 illustrates an exemplary eye variation image.
Figure 16:
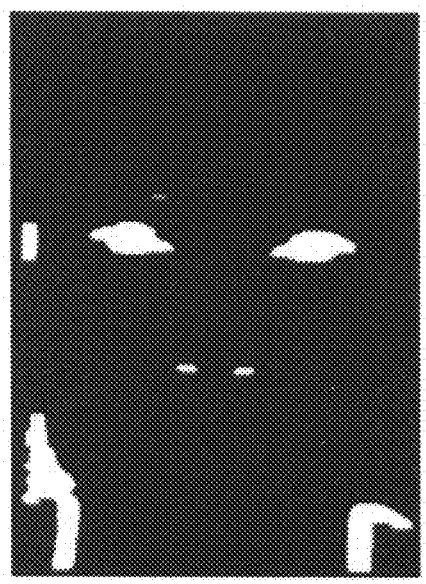
FIG. 16 illustrates another exemplary eye variation image.
Figure 17:
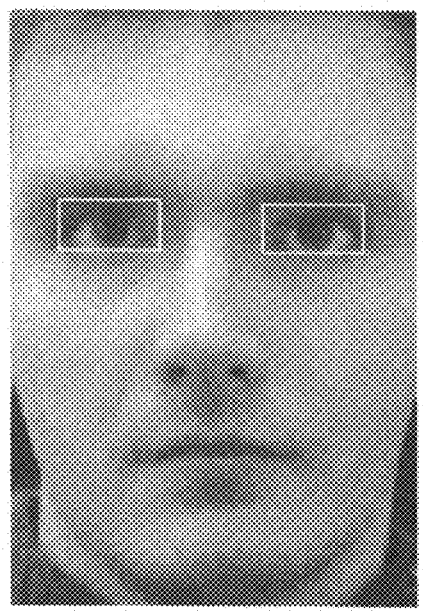
FIG. 17 illustrates a result of eye bounding boxes detection.

A variation image is calculated using 4 combinations of 'n' and α to eliminate possible errors in the face detection and to cope with variations in the shape of eyes. FIGS. 15 and 16 illustrate exemplary eye variation images obtained using the following different combinations of coefficients:

n=OPTIMAL_FACE_WIDTH/30, α=0.6, n=OPTIMAL_FACE_WIDTH/25, α=0.6, n=OPTIMAL_FACE_WIDTH/30, α=1.4, and n=OPTIMAL_FACE_WIDTH/25, α=1.4.

Third, the connected components in thresholded variation images are tested to satisfy the shape, size and relative positions criteria to get the best matching eye boxes. The results obtained from different variation images are merged together according to the following strategy:

Step 1. Start from the smallest scale (the first configuration listed above);

Step 2. If the eye-candidates are present at the current scale:
  a) If no candidates were detected at previous scales, set the eyes to current candidates and go to step 3;
  b) If the candidates were already found, compare the current scale candidates with the previous ones. If the sizes and positions of the candidates don't change dramatically, update the eyes with the candidates at the current scale.

Step 3. Take next (larger) scale and go to step 2;

The Eye Bounding Boxes of FIG. 9 are the Detected Results.

1.1.4. Eye Irises Detection

Figure 18A:
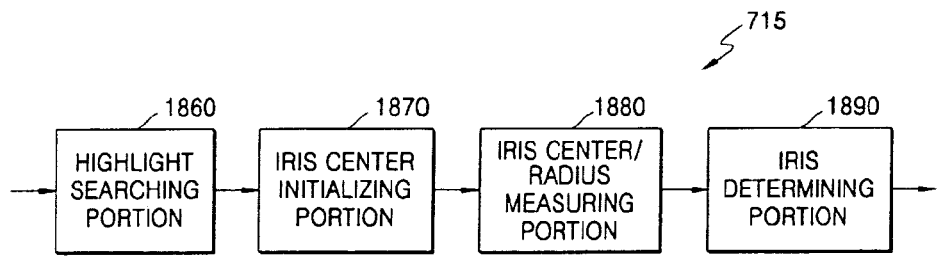
FIG. 18A is a block diagram of an iris detecting portion of FIG. 7.

The irises are detected from the eye bounding boxes in the red channel image. FIG. 18A is a block diagram of the iris detecting portion 715 of FIG. 7. Referring to FIG. 18A, the iris detecting portion 715 includes a highlight searching portion 1860, which determines whether a highlight exists by comparing the number of pixels having maximum brightness values in each of the eye bounding boxes in the red channel image with a threshold value, an iris center initializing portion 1870, which initializes the center of mass of the darkest pixels as the center of the iris if no highlight is found and initializing the center of a high contrast region near a highlight as the center of the iris if the highlight exists, an iris center/radius measuring portion 1880, which repeatedly measures gradients of the pixels along an initial circle at the center of the iris while enlarging the initial circle, and an iris determining portion 1890, which determines a region having the largest gradient as the center of the iris and the radius of the iris.

Figure 18B:
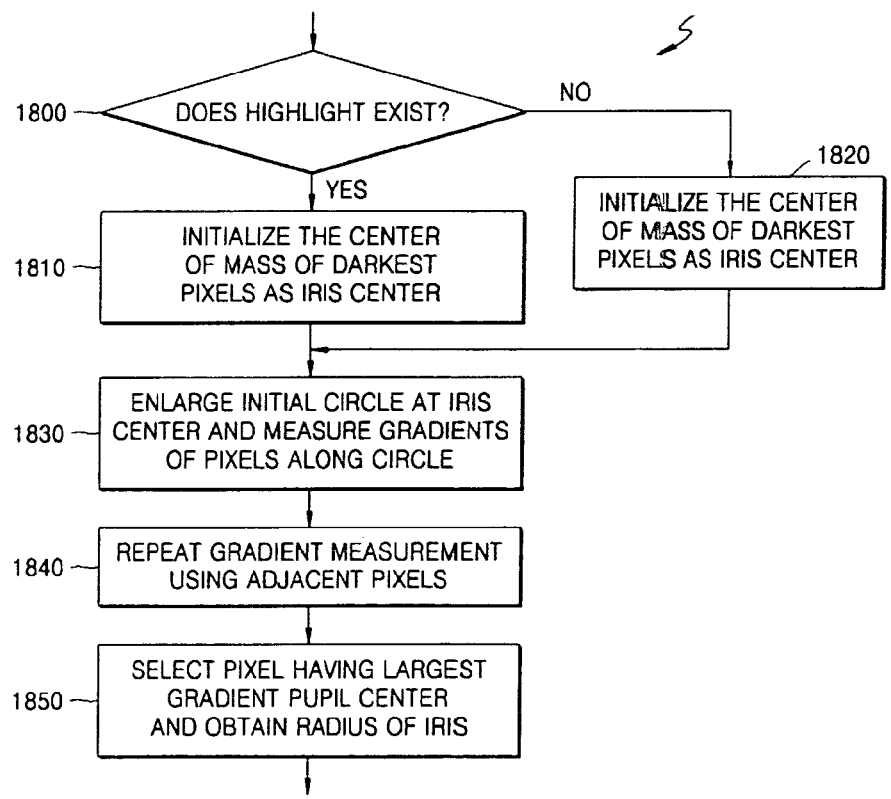
FIG. 18B is a flowchart of detection of the center and radius of an iris.

FIG. 18B is a flowchart of detection of the center and radius of the irises. The number of pixels having maximum brightness values in an eye bounding box in the red channel image is compared with a threshold value to determine whether a highlight exists (operation 1800). If no highlight is found, the center of mass of the darkest pixels is initialized as the iris center (operation 1820). If a highlight exists, the center of a high contrast region near the highlight is initialized as the iris center (operation 1810).

An initial circle at the iris center is enlarged, and gradients of the pixels along the circle are measured (operation 1830). This gradient measurement is repeated using pixels adjacent to the initial iris center (operation 1840). A region having the largest gradient is selected as the iris center and the radius of the iris is obtained (operation 1850).

The eye irises detection process will be described in detail. The iris centers are first estimated approximately, and then refined during the iris radius detection.

In the iris center estimation process, if there is no highlight found inside the eye-bounding box, the center of mass of the darkest pixels is initialized as the iris center; while if a highlight exists, the center of a high contrast region around the highlight is initialized as the iris center. The iris center detection is performed as follows using the R-channel image pre-processed in the previous stage:

1) Filter the eye area using a 3×3 median filter to eliminate noise;
2) Determine whether a highlight is present or not by comparing the number of pixels having maximum brightness values inside the eye bounding box with a predetermined threshold;
3) Detect the iris center (using different methods depending on whether a highlight exists in the iris);
a) When a strong highlight is found inside the iris, a central area of the eye bounding box is scanned using a template matching method. A circular template with a fixed radius is moved inside the search area, and the conditions listed below are checked at each location to detect the iris center:
   i) The local minimum value (dLocalMinVal) inside the search window should not be too close to the local maximum (dLocalMaxVal) inside the search window (because this makes it sure that both dark pixels and highlights are present in the search window);
   ii) dLocalMinVal should be dark enough;
   iii) dLocalMaxVal should be bright enough.

Using all the locations where these conditions are satisfied, the expected iris center is determined as the center of mass of these locations.

4) When a strong highlight is not found:
a) A 5×5 minimum function is applied to the eye area to eliminate weak highlights;
b) The eye area is convolved with $$W(x, y, c) = \frac{\sin((x^2 + y^2)/c)}{(x^2 + y^2)/c} \quad (4)$$

Significant weights are assigned to a center part of the processed block during the convolution, while negative weighs are assigned to the boundary part thereof. Parameter c controls the radius of the region to which a positive weight is assigned.

c) The most darkest points, which are compared with a predetermined threshold, are averaged to find the iris center.

Next, the iris center (xc, yc) initialized in previous step is refined by performing the following processes using all pixels (x, y) around it. The iris radius R is also detected in this procedure.

Figure 19:
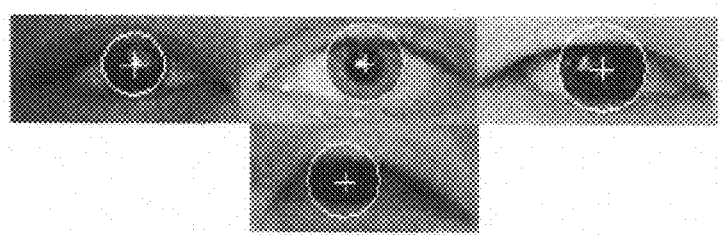
FIG. 19 illustrates examples of detected irises.

1) The following calculation is performed on all pixels (x, y) near the iris center (xc, yc):
   a) For R=MinR to R=MaxR:
      i) Calculate the sum of intensities of the pixels positioned at the left and right boundaries of the circle having a radius R-1 and centered at (x, y); the top and bottom parts are very likely to be occluded by eyelids so they are not used.
      ii) Calculate the sum of intensities of the pixels positioned at the left and right boundaries of the circle having a radius R and centered at (x, y); the top and bottom parts are not used.
      iii) Calculate the difference (D(R, x, y)) between these two sums.
   b) Choose a maximum D(R, x, y), and record the corresponding radius R as Rmax(x, y).
2) Choose a maximum D(Rmax(x, y), x, y) among the values for all pixels (x, y), and take the corresponding pixel (x, y) as the center of the iris and Rmax(x, y) as the radius of the iris. FIG. 19 illustrates some results of the iris detection.

1.1.5. Face Image Normalization

After the iris detection, the face image is rotated such that the line between the iris centers is strictly horizontal. The size of the face bounding box is also adjusted using priori knowledge regarding the proportion between the size of the face and the distance of the two iris centers. Then the input image is cropped to contain only the face region and scaled to a predetermined width.

1.1.6. Eye Contour Detection

Figure 20:
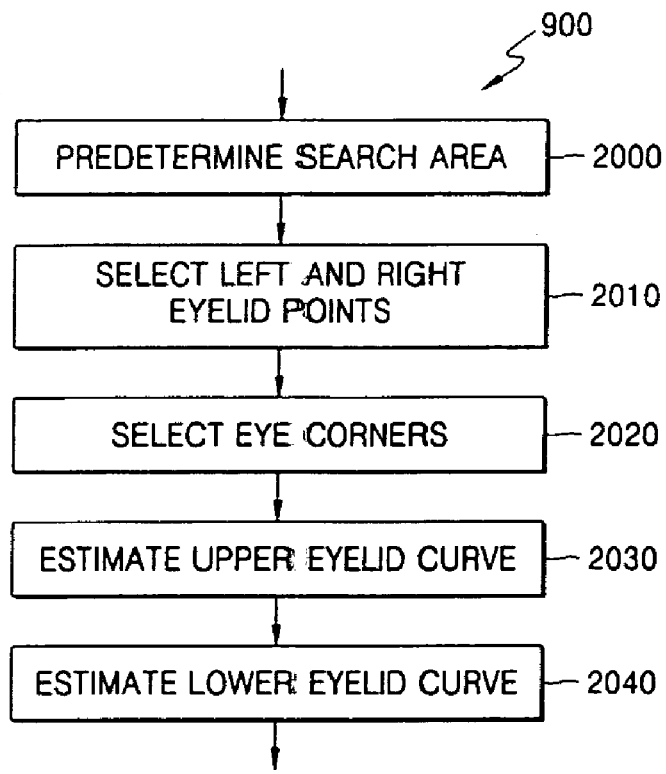
FIG. 20 is a flowchart of approximation for eye contour detection.

Eye contours are approximated using two polynomials for upper and lower eyelids. FIG. 20 is a flowchart of approximation for eye contour detection. A search area is predetermined according to the center and radius of the iris (operation 2000). Pixels on each horizontal scan line in the red channel image in the search area, in which local minimums or brightness abruptly change, are selected as left and right eyelid points (operation 2010). The leftmost and rightmost points among the remaining eyelid points are selected as eye corners (operation 2020). The upper eyelid curve is estimated using points on the line connecting the eye corners by a minimum square method (operation 2030). The lower eyelid curve is estimated using the selected eye corners and the lower point of the iris (operation 2040).

The eye contours detection process will be described in detail. One eye contour model consists of two polynominals for the upper eyelid (cubic in both x and y) and lower eyelid (quadratic in both x and y). After the estimation of the center and radius of the iris, the upper eyelid is approximated from an area of low-intensity pixels (the border between the eye white and skin). No additional detection is required for the lower eyelid, and the lower eyelid is directly approximated from the eye corners and the lower point of the iris.

Initially, before detection of the upper eyelid, the red channel eye image is filtered using a median filter and Gaussian-smoothened to lower the noise level. A search area for eyelid points is predefined according to the center and radius of the iris.

Secondly, the upper eyelid points are detected using the following algorithm.

Figure 21:
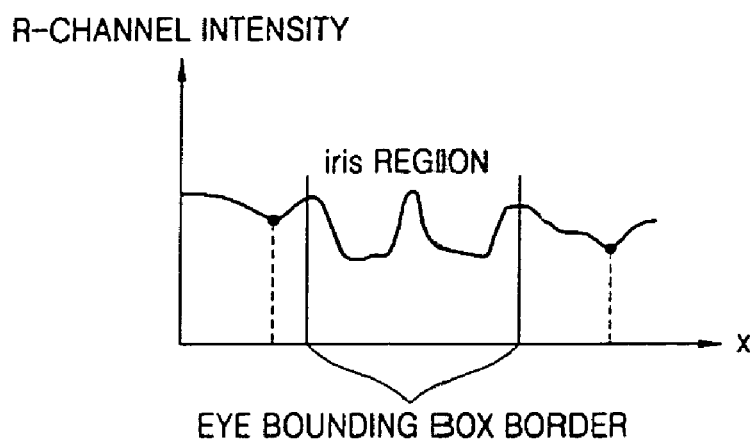
FIG. 21 is a graph of red channel intensities in an eye area along horizontal direction used for eye contour detection.

1) For each vertical position inside the search area:
2) If at current vertical position the iris is covered with skin (the average intensity in this line is greater than a threshold), the process goes to 1;
3) The pixel intensity values in the current line are scanned from the left border of the iris to the left border of the eye bounding box to find areas where local minimums or brightness significantly increases significantly (see FIG. 21). These areas correspond to a left side portion of the upper eyelid;

4) The same process is performed on the right side. That is, the pixel intensity values in the current line are scanned from the right border of the iris to the right border of the eye bounding box to find areas where local minimums or brightness increase significantly (see FIG. 21). These areas correspond to a right side portion of the upper eyelid;

The above-described algorithm gives a set of points that are assumed to lie on the upper eyelid. To exclude erroneously detected points, the left and right halves of the eye bounding box are processed as follows.

Figure 22:
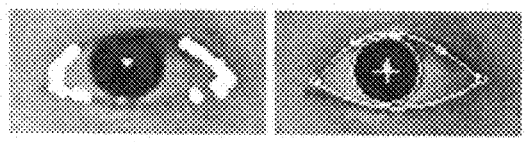
FIG. 22 illustrates points used for eye contour detection and a detected eye contour.

1) Approximate points to lines by Hough transformation;
2) Choose the line with reasonable orientation and maximum number of points that are close to it;
3) Remove all points which are too far away from the estimated line;

Among the remaining points the leftmost and rightmost are chosen as the eye corners, the points that lie above the line connecting the eye corners are utilized to estimate the upper eyelid curve (see FIG. 22).

1.1.7. Eyebrows Detection

Figure 23:
FIG. 23 illustrates detection of vertical eyebrows positions.

The vertical eyebrows position is approximated as the global minimum in the normalized horizontal integral projection of the pixels (H(y) below) in a forehead area (see FIG. 23):

$$H(y) = \frac{\sum_{x \in Face(y)} (gray(x, y))}{Wdt(y)} \quad (5)$$

Where Face(y) is a set of x satisfying that (x, y) is inside the face ellipse; Wdt(y) is the width of the face ellipse at position y, and gray(x,y) is the intensity of a gray value at (x, y).

Figure 24:
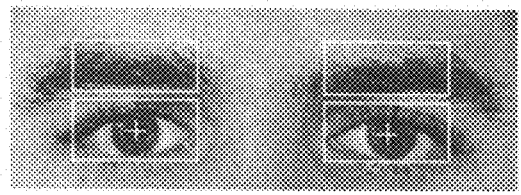
FIG. 24 illustrates eyebrow bounding boxes.

If the found vertical eyebrow position is too far away from the eye, the vertical eyebrow position is set to a predetermined value according to the face size and iris center positions. Then, an eyebrow bounding box is determined based on empirical information on the eyebrow position (see FIG. 24).

Figure 25:
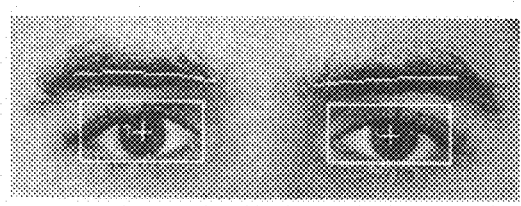
FIG. 25 illustrates detected eyebrows.

Afterwards a third degree (cubic) polynomial is approximated to express the eyebrow. First, along each vertical segment inside the eyebrow rectangle, points at which gray values are greater than a predetermined value are collected as eyebrow points, and the mean position of these points is calculated. The eyebrow curve is estimated using the mean positions (see FIG. 25).

1.1.8. Lip Contour Detection

Figure 26:
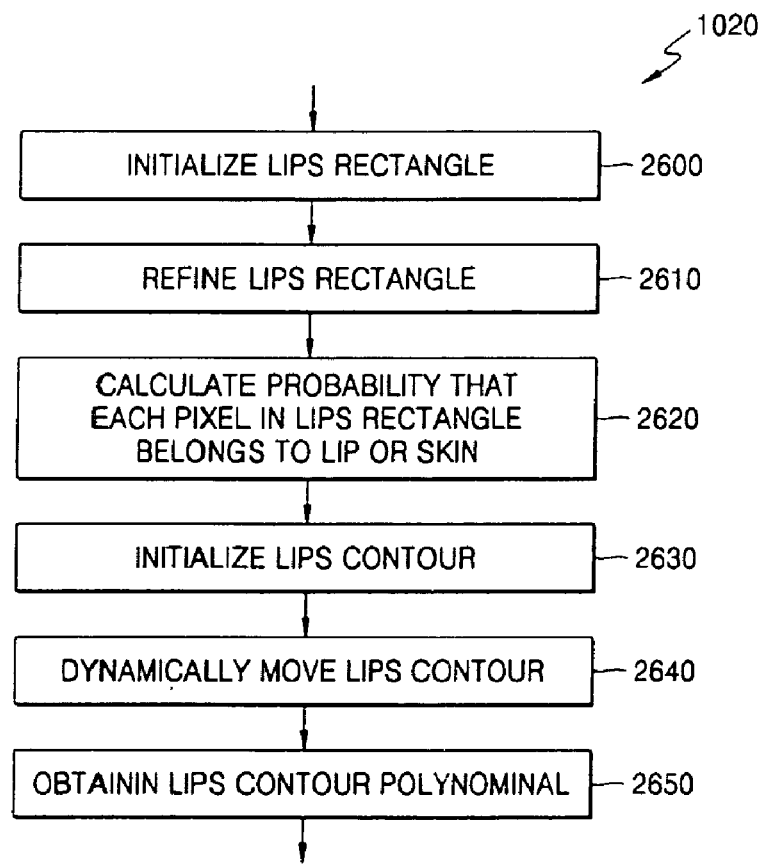
FIG. 26 is a flowchart of upper and lower lips detection.

The lip contour detection includes upper lip detection and lower lip detection. FIG. 26 is a flowchart of upper and lower lips detection.

The upper and lower lips are detected as follows. Initially, a lips rectangle is initialized (operation 2600). The initial lips bounding box is refined to be smaller by analyzing the moments of non-skin color pixels (operation 2610). A lip function image is created, and the probability that each pixel in the refined lips bounding box belongs to a lip or skin is calculated (operation 2620). The second-order central moments of pixels having large lip function values are calculated, and a lips contour is initialized using an ellipse (operation 2630). The lips contour is dynamically evolved by inward and outward forces (operation 2640). A polynomial expressing the lips contour is obtained by approximation using the evolved contour points (operation 2650).

The outward force is a force moving contour points to the lip-skin boundary. The inward force consists of an internal shaping force, which shapes the contour to be elliptical, and an internal smoothening force, which is determined by predetermined factors, including a force suppressing contour points from being moved beyond the boundary.

Figure 27:
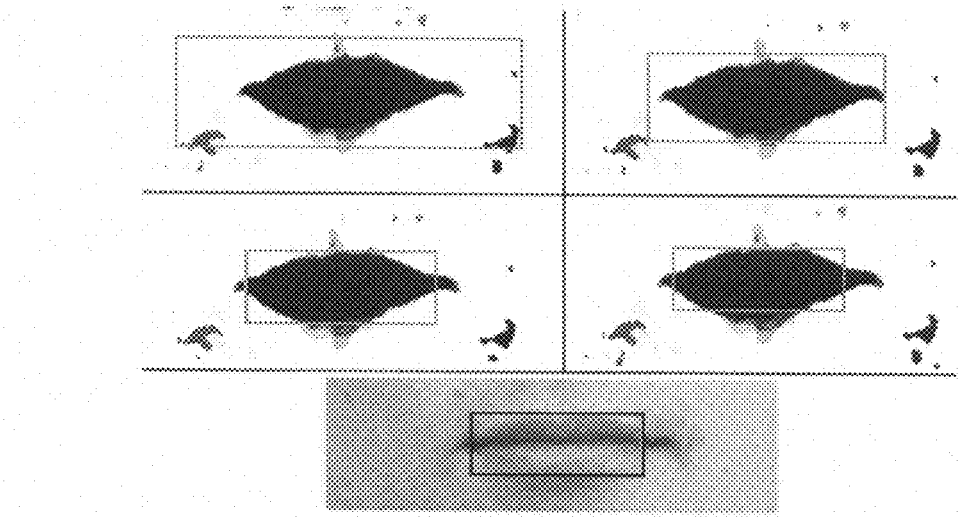
FIG. 27 illustrates iterative refinements of a lips rectangle.

The lips contour detection will be described in detail. A first step in lips contour detection is to estimate a reasonably accurate bounding rectangle. This estimation step includes the following steps:

1) A person-specific skin color histogram is built during the skin detection stage;
2) A rectangle centered near an expected mouse position is set to be the initial lips bounding rectangle.
3) The center of mass and the second order moments of pixels having small person-specific skin color histogram values in the current rectangle are iteratively calculated to more accurately refine the lips box (see FIG. 27).

The lips box refinement is performed several times, for example, about six times, which is usually enough for reasonably accurate lip bounding box calculation.

Next, the lip function image is generated to measure the likelihood that the color of each pixel belongs to lip or skin color. Both classes of the two colors are represented by two-dimensional Gaussian probability density functions in (r=R/G, b=B/G) space. The pixels with low person-specific skin histogram values in the lips bounding rectangle are used for lip color class calculation; pixels marked as skin during skin detection are used for skin color class estimation. After the two color classes are calculated the lip function image is generated using the following formula:

$$\text{lip\_func}(x,y) = \alpha_1 p_1(r(x,y),b(x,y)) - \alpha_2 p_s(r(x,y),b(x,y)) \quad (6)$$

Where $p_1(r(x,y),b(x,y))$ is the probability density value of the lip color class at pixel position (x,y); $p_s(r(x,y),b(x,y))$ is the probability density value of the skin color class at pixel position (x,y); and $\alpha_1$ and $\alpha_2$ are coefficients. Therefore, lip_func (x,y) represents the difference between the probability that the pixel belongs to the lip color class and the probability that the pixel belongs to the skin color class.

A third step includes calculating the second-order central moments of pixels having large lip function values and approximating the lips contour using an ellipse.

Figure 28:
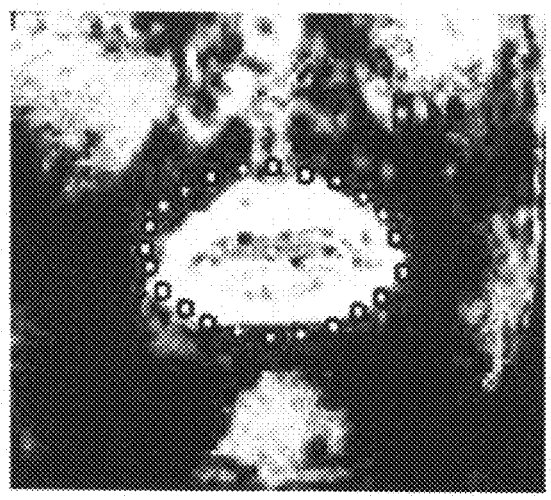
FIG. 28 illustrates a lip function image with initialized lip points.
Figure 29:
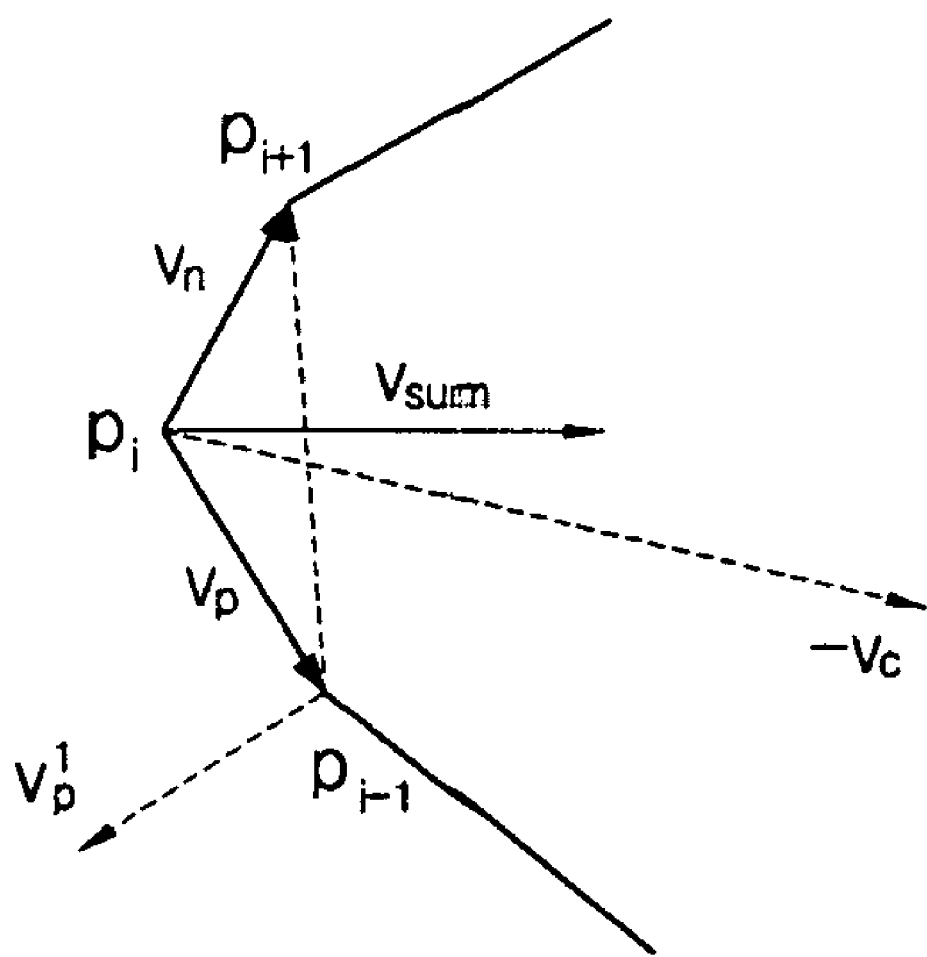
FIG. 29 illustrates forces acting at lip contour points.

A fourth step includes generating an accurate lips contour by repeatedly applying the algorithm to the lip function image. The lips contour can be initialized as a closed polygon consisting of points on the boundary of the ellipse that are sampled at the same interval and angles (see FIG. 28 for the lip function image and initialized lips contour points). At each iteration contour point $p_i$ is moved according to a set of simple rules. In an embodiment of the present invention, the direction in which the contour point $p_i$ is moved by a force is $v_c$ (see FIG. 29). The directional movement $F_i$ of a contour point is determined as the sum of three forces given by equation (7) below:

$$F_i = F_i^{data} + F_i^{form} + F_i^{sm} \quad (7)$$

where $$F_i^{data} = \begin{cases} k_{out}, f \geq T \\ -k_{in}, f < T \end{cases};$$

$$F_i^{form} = k_{form} \frac{(-v_{sum}) * v_c}{|-v_{sum}|}, \text{ where } v_{sum} = v_p + v_n;$$

$$F_i^{sm} = -k_{sm}(1 + v_p * v_n/(|v_p||v_n|)) * \text{sign}((p_{i+1} - p_{i-1}) * (-v_p^1));$$

$P_{i-1}$, $P_i$ and $p_{i+1}$ are three clockwise consecutive contour points, and all k* are predetermined positive coefficients. $k_{sm}$ is a coefficient that varies according to the positions of the contour points and the direction in which the contour points are moved, while the other coefficients are constant.

In fact, to allow the algorithm to be matched with corners, $F_i^{sm}$, which is an elliptical constraint described later, should less contribute to lip corner points than $F_i$. So $k_{sm}(i)$ is smaller for points found near the corners of the ellipse in the previous iteration step. The lower part of the lip contour is smoother than the upper part, which is applied when calculating $k_{sm}(i)$.

f is a value at position ($p_i$) in the lip function image; T is a predetermined threshold; $v_p$ and $v_n$ are the vectors from the current point $p_i$ toward the previous and next contour points (see FIG. 29); $V_c$ is a normalized direction from the ellipse center toward $p_i$; $v_p^1$ is generated by turning $v_p$ clockwise by $\pi/2$.

In summary, $F_i^{data}$ is the force controlling the expansion or contraction of the contour to fit actual data at point $p_i$, and $F_i^{form}$ forces the shape of the contour to be close to ellipse. To allow the force $F_i^{form}$ to affect the global contour form, $v_n$ and $v_p$ are taken from the average of next (previous) several points. $F_i^{sm}$ controls the smoothness of the contour by not allowing any single point to go far beyond the boundary.

Figure 30:
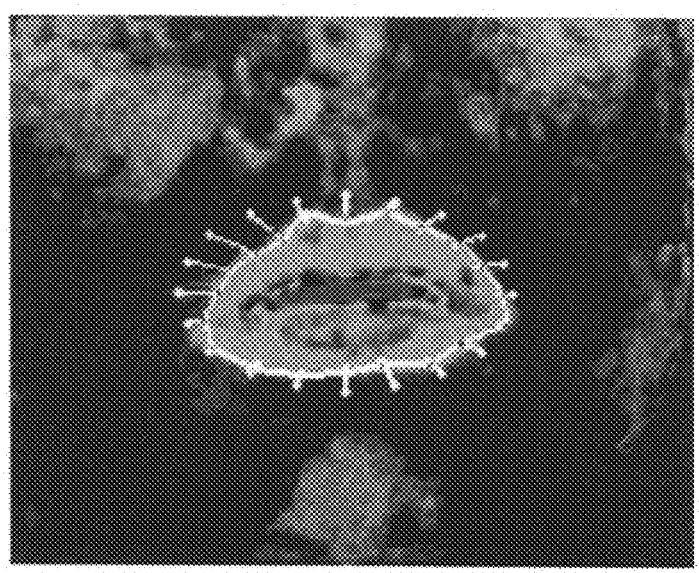
FIG. 30 illustrates one step of lip contour updating.

The above algorithm is terminated after about 30 iterations. One lips contour updating process is illustrated in FIG. 30. Next, polynominals (fourth degree for both the upper and lower lips) are fitted to the resulting points from the iterations to generate a lips contour curve.

1.1.9. Nose Contour Detection

Figure 31:
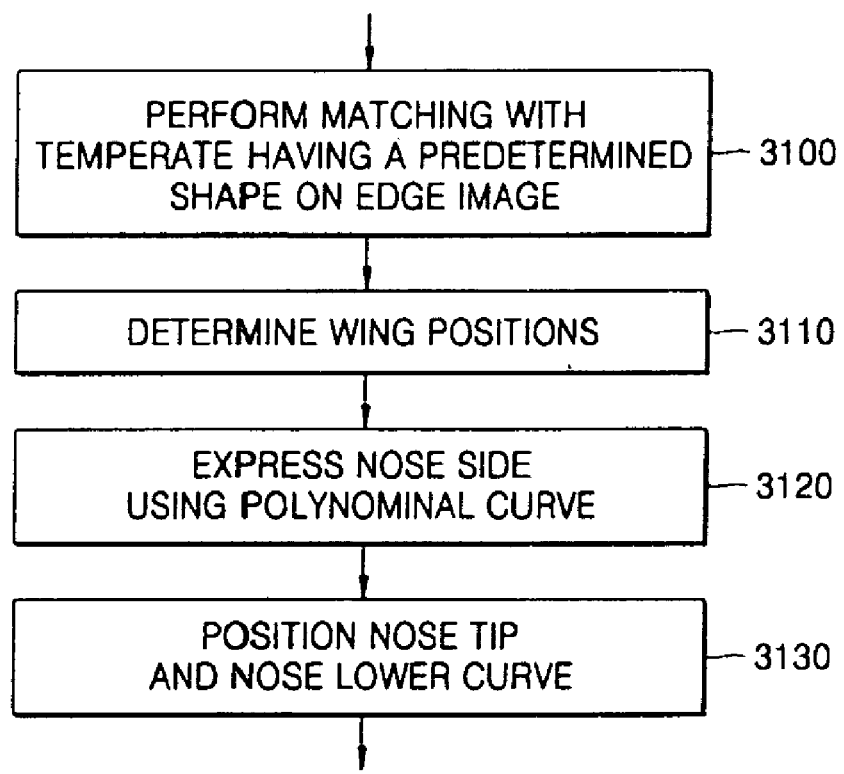
FIG. 31 is a flowchart of nose side detection in a nose contour detection process.

The nose contour detection includes nose side detection. FIG. 31 is a flowchart of nose side detection in the nose contour detection process. The nose side detection is performed as follows. First, matching with a temperate having a predetermined shape is performed on an edge image in a predetermined search area (operation 3100). Among detected candidates having large matching values a pair of candidates that satisfy the requirement for symmetry is selected and determined as nose wing positions (operation 3110). Each nose side is expressed using a fourth degree polynominal curve. This polynominal curve is fitted to the detected nose wing templates and three points interpolated between the nose wing and eye corners with predetermined coefficients (operation 3120). Finally the nose tip and nose lower curve are positioned using predefined interpolation coefficient (operation 3130).

The nose contour detection process will be descried in detail. It is very difficult to build a universal nose detection technique that can be used regardless of imaging and lightening conditions. Of course, in the conditions of front illumination and good sharpness, no significant problem arises because a distinct edge pattern appears in the nose area. However, in some cases where the photograph is blurry or is taken under no-directional, ambient-like illumination, the nose edge area is too noisy to identify the edge patterns. In this case, the nose wings can be detected using a directional edge-map template that provides good robustness to images in different classes. This nose contour detection algorithm can be implemented according to the following steps.

1) A nose area image (ranging laterally between the eye-centers and vertically from the bottom of the eyes to the top of the mouse-bounding box) is cropped and scaled to a fixed resolution.
2) A median filter is applied to the nose area image to remove noise and protect edge information.
3) Edge gradient images are calculated using a Prewitt edge detector.
4) A directional nose wing template is matched with the nose area image to detect the nose wings.

Figure 32:
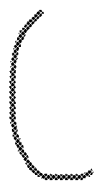
FIG. 32 illustrates a nose wing template.
Figure 33:
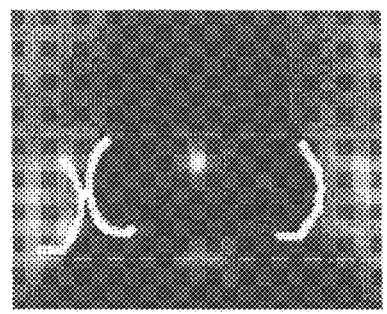
FIG. 33 illustrates nose wings candidates detected in an image.

A nose wing template expresses a typical shape of nose side at a fixed scale (see FIG. 32). The accuracy-of-fit is measured as the sum of the edge magnitudes of pixels that lie on the border of the nose wing template and have edge directions close to the tangent of the template. Nose candidates are obtained from the positions with maximum 10% accuracy-of-fit, and pairs of candidates (left and right nose wings candidates) are tested according to the following three criteria to determine the most probable nose position (see FIG. 33).

First, overlapping condition: a pair of candidates should have similar heights.

Secondly, separate condition: a pair of candidates should be not too close each other in x-direction.

Thirdly, symmetry in x-direction: the difference between the distances in X-direction from the candidates to the face center should not be too large.

Figure 34:
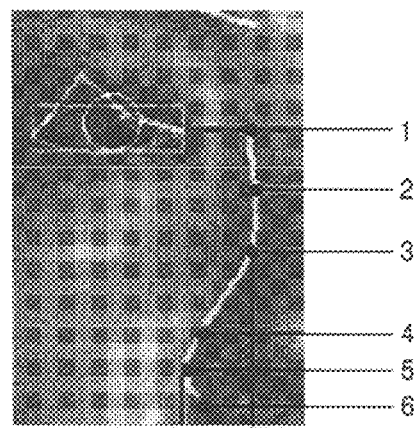
FIG. 34 illustrates the placement of main feature points for a nose curve.

Next, a fourth degree polynomial is fitted to the six points marked in FIG. 34, among which points 1, 2, and 3 are sampled from the detected template at predefined positions, and others are interpolated between the nose template and eye rectangles using predefined coefficients.

Figure 35:
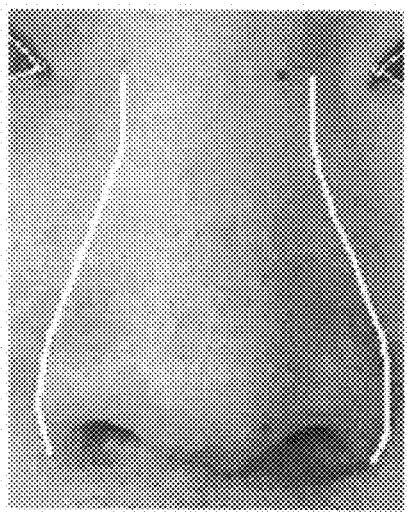
FIG. 35 illustrates detected nose curves.

The above-described nose sides contour detection method results in very good robustness and accuracy when applied to different-quality images taken under different lightening conditions. An example of the nose sides contour detection is illustrated in FIG. 35.

The nose tip is the middle point of two side wing template centers. The lower nose curve (see FIGS. 38 and 39) is positioned between two nose sides using predefined coefficients.

1.1.10. Chin and Cheeks Contour Detection

Figure 36A:
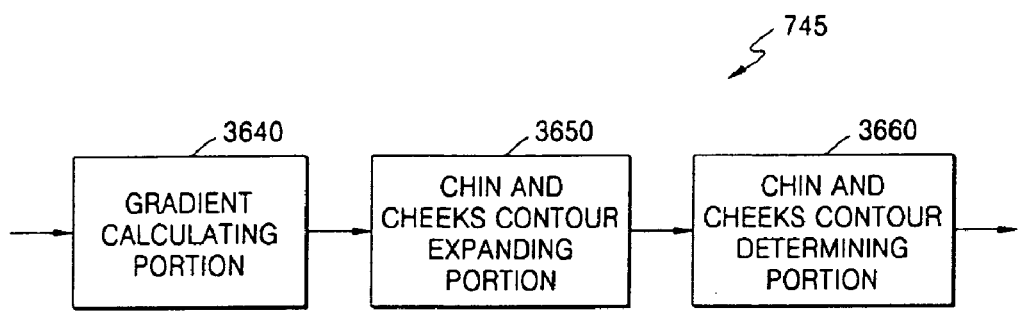
FIG. 36A is a block diagram of a chin and cheeks contour detecting portion of FIG. 7.

FIG. 36A is a block diagram of the chin and cheeks contour detecting portion 745 of FIG. 7. Referring to FIG. 36A, the chin and cheeks contour detecting portion 745 includes a gradient calculating portion 3640, which calculates a gradient vector field on a red channel image, a chin and cheeks contour expanding portion 3650, which positions an initial contour template in a face region defined by two polynominal curves crossing at a chin point and expanding the chin and cheeks contour outward until the chin and cheek contour reaches strong edges along the tangents of the curves, and a chin and cheeks contour determining portion 3660, which stops expanding the chin and cheeks contour when the chin and cheeks contour has reached the strong edges on the tangents of the curves.

Figure 36B:
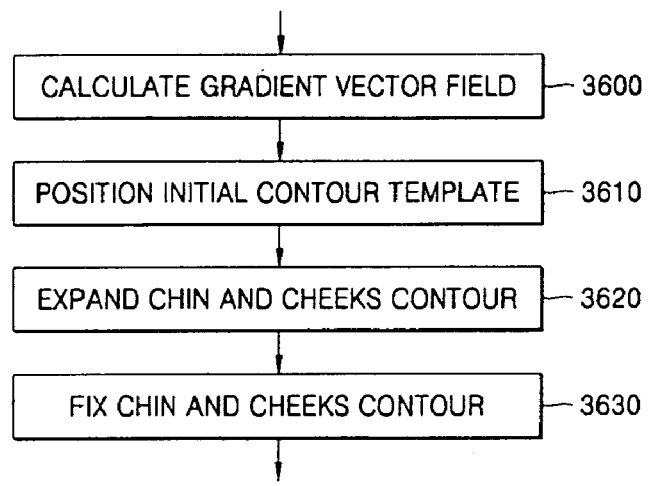
FIG. 36B is a flowchart of chin and cheeks contour detection.

FIG. 36B is a flowchart of chin and cheeks contour detection. The chin and cheeks contour detection process is performed as follows.

First, a gradient vector field on the red channel image is calculated (operation 3600). An initial contour template is positioned in a face region defined by two polynominal curves crossing at a chin point (operation 3610). The chin and cheeks contour is expanded outward to strong edges along the tangents of the curves (operation 3620). Expanding the chin and cheeks contour is stopped when significant-brightness valleys are reached (operation 3630).

Figure 37:
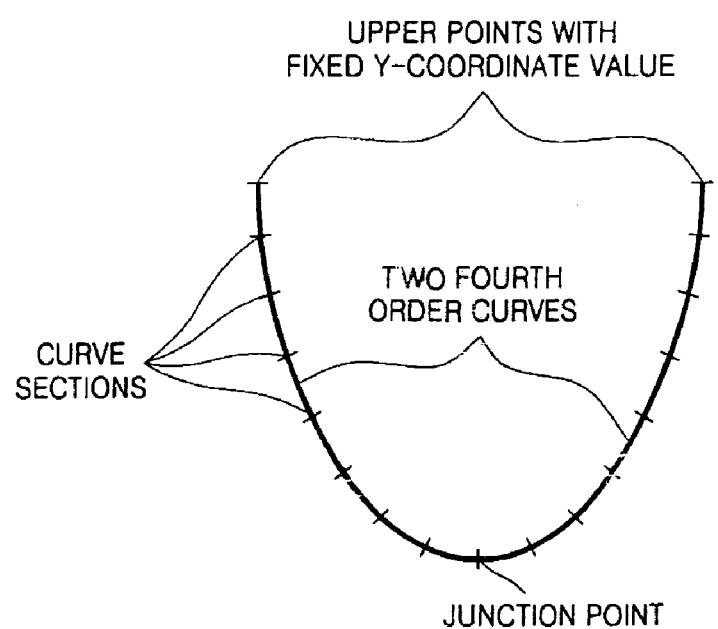
FIG. 37 illustrates a chin/cheeks deformable model.

The chin and cheeks contour detection process will be described in detail. The chin and cheeks contour is expressed by two continuous fourth degree polynominals crossing at the bottom chin point. The two polynominals have a fixed Y-coordinate value at upper ends. The curve defined by the polynominals is divided into a plurality of sections (see FIG. 37). The chin and cheeks contour detection process includes the following steps.

1) Edge images and a chin curve are initialized as follows.
   a) The horizontal and vertical edge images are generated by:
      i) scaling the original red-channel image to fit to OPTIMAL_FACE_WIDTH, performing Gaussian-smoothing on the scaled image, and filtering the image using a median filter; and
      ii) detecting the edges using a Sobel edge detector.
   b) The left and right curves are initialized from three points, the bottom point, the left upper point, and the right upper point, to be symmetrical. The three points are determined using a priori knowledge of the detected eyes and lip positions.
2) The curve is refined by repeating the following processes:
   a) For each section i (from 0 to N, where N is a total number of sections):
      i) The accuracy-of-fit is set to 0;
      ii) For each sampling point (x,y) in section i: if the angle between the tangent of the curve and the image edge direction at (x,y) is less than 60 degrees, and the edge magnitude at (x, y) is not less than a predetermined threshold, the accuracy-of-fit is increased; and
      iii) If the accuracy-of-fit is less than another given threshold, the section is moved "outwards" along the curve normal vector. Otherwise, the section is moved slightly "inwards".
   b) The curve is refit to all sections.

Figure 38:
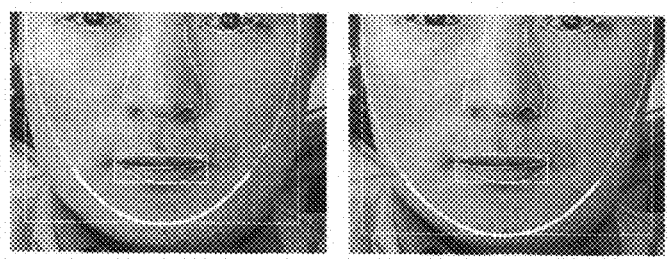
FIG. 38 illustrates a chin model fitting process.

In 2.a.iii), all the sections of the curve are expanded outwards along the normal of the curve (see FIG. 38 for the intermediate stages of the chin fitting process). However, moving the sections in a lower part of the curve outward should be stopped when significant-brightness valleys are reached because in the lower chin area the edges are usually very weak. Here, the following decision rules can be applied to the lower part of the curve:
   c) For each section i of the lower part of the curve:
      i) The accuracy-of-fit is set to 0;
      ii) The average brightness (CurBrt(i)) of the pixels (x, y) of the section i is calculated;
      iii) The section i is moved outwards along the normal of the curve and the average brightness (MovedBrt(i)) of the pixels is calculated.
      iv) if MovedBrt(i)<CurBrt(i), then the section is moved "outwards".

Otherwise, the section i is moved slightly "inwards" into a shadow area.

Figure 39:
FIG. 39 illustrates all detected features in frontal images.

All the features in frontal images are illustrated in FIG. 39. The above-described algorithms are fully automated and robust to different images and various lightening conditions.

1.2 Profile Feature Detection

Figure 40:
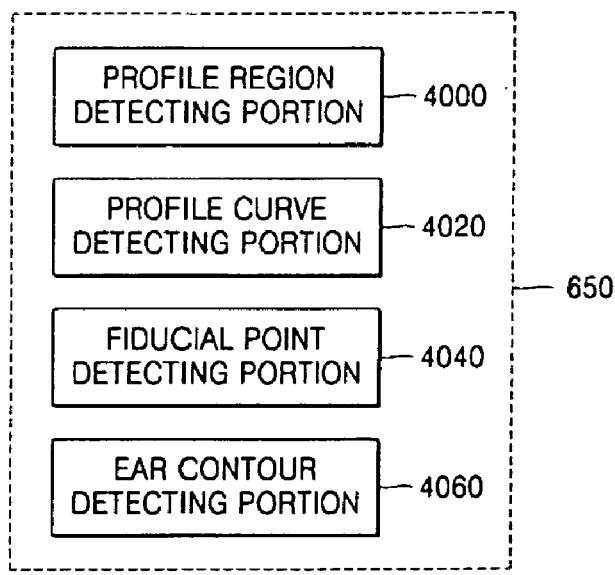
FIG. 40 is a detailed block diagram of a profile feature detecting portion.

FIG. 40 is a detailed block diagram of the profile feature detecting portion 650. The profile feature detecting unit 650 includes a profile region detecting portion 4000, a profile curve detecting portion 4020, a fiducial point detecting portion 4040, and an ear contour detecting portion 4060.

The profile region detecting portion 4000 classifies pixels into skin pixels and non-skin pixels and selects the largest skin-colored connected component as a profile region.

The profile curve detecting portion 4020 detects the rightmost boundary of a face region in a user-specified bounding box in the frontal image as a profile curve.

The ear contour detecting portion 4060 initializes the position of the ear by matching a curve template with the profile image. The initialized ear template is morphed using a contour following algorithm to find a more accurate ear contour.

Figure 41:
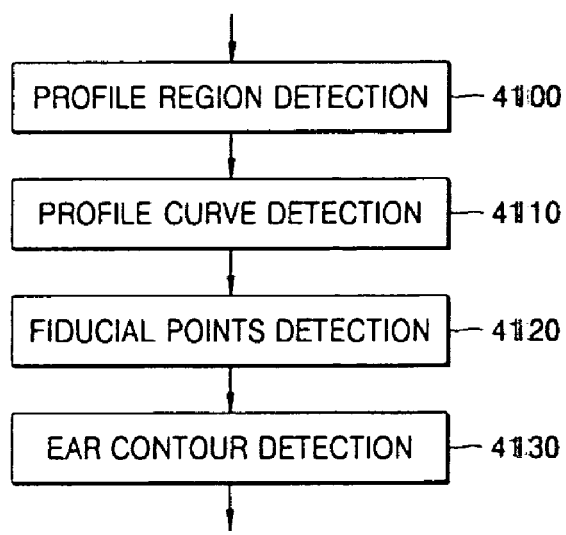
FIG. 41 is a flowchart of profile feature detection.

FIG. 41 is a flowchart of profile feature detection. The profile feature detection process may include profile region detection (operation 4100), profile curve detection (operation 4110), fiducial points detection (operation 4120), and ear contour detection (operation 4130). The detected profile curve can be segmented into sections based on the fiducial points detected from, for example, forehead, nose, lips, chin, neck regions, etc.

Throughout the profile region detection process, the results from previous steps are checked in later steps. If an intermediate result from a previous step is found to be erroneous, the algorithm automatically returns to the previous step to correct errors using a larger amount of image information.

Currently, interaction with a user is required for profile feature detection. As a first example, if the face size is not large enough and the background of a face image is complex and includes a skin-colored object, the user is requested to define a face-bounding rectangle. However, this is an unusual case. Face regions can be fully automatically detected in almost all test images.

As a second example, after the initial positions of the head top and back, eye points, and lips points are set based on priori statistical data, the user may be requested to correct the positions.

1.2.1. Face Region Detection

The face region detection process includes classifying pixels into skin pixels and non-skin pixels and selecting the largest skin-colored connected component as a face region. When there are two largest connected components having similar sizes, one of the components closer to the center of the image is selected as the face region.

In particular, in a similar manner used in the frontal image process, it is determined whether pixels are skin pixels or non-skin pixels using a normalized r-g color space and a trained skin-color model. The largest skin-color connected component or one of the two largest skin-color components having similar sizes that is closer to the center of the image is selected as a face region.

Figure 42:
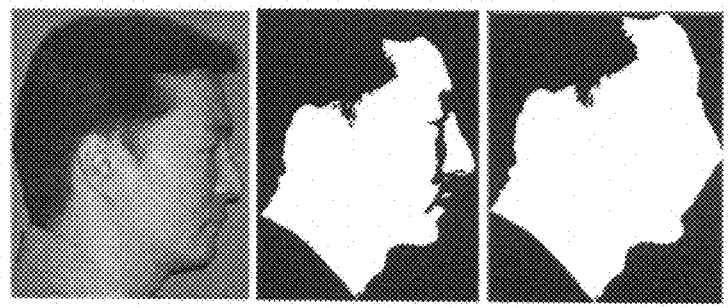
FIG. 42 illustrates a case where detection of a profile region has failed and discontinuous skin and nose regions appear.
Figure 43:
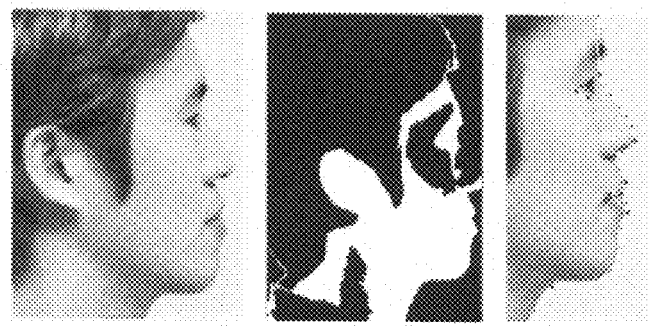
FIG. 43 illustrates another case where detection of a profile region has failed and an imperfect nose region appears.
Figure 44:
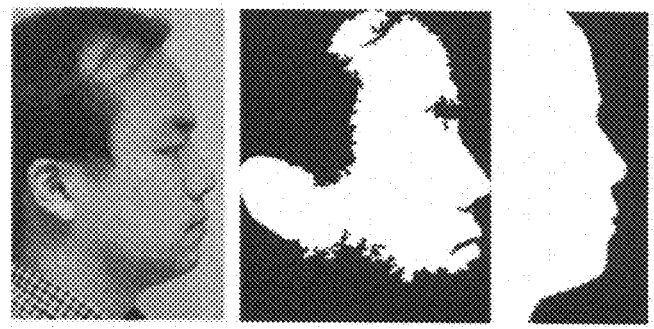
FIG. 44 illustrates another case where detection of a profile region has failed and an imperfect skin region appears.

In some cases, a nose region and the face region may be discontinuous (see FIG. 42). Such a problematic situation can be detected by checking adjacent skin-color connected components, and the nose region and the face region are merged together. There are additional two problematic situations. A first case is that a whole nose region cannot be obtained if lightening is too strong (see FIG. 43). A second case is that a whole chin region cannot be detected if lightening is slightly dark or if mustache is included (see FIG. 44). The first case is recognized in nose bridge tracking procedure after nose tip is detected. The second case is judged after chin and neck points are detected.

When skin detection has failed, the face region is detected using a pyramid-based area segmentation algorithm. An input image for the pyramid-based area segmentation algorithm is one channel in HSV conversion of the original image. This channel is selected based on the performance of discriminating skin from the background across the nose bridge.

1.2.2. Profile Curve Detection

The rightmost boundary of the face region in a user-specified bounding box obtained from the frontal image is detected as the profile curve.

In particular, when the face region is detected by skin detection, the rightmost face region pixels inside the user-specified bounding box are detected for the profile curve as follows.

Figure 45:
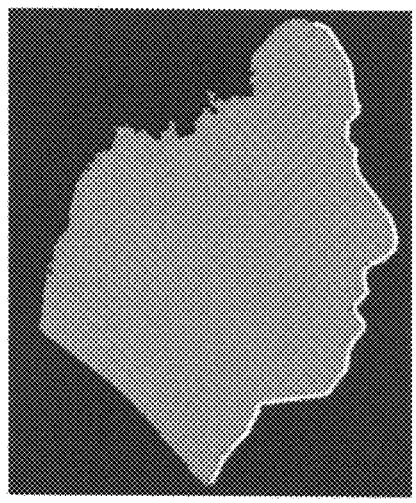
FIG. 45 is an image for explaining a typical profile function.

1) The input is the binary results of skin detection (1 means that the pixel belongs to skin, and 0 means the opposite case) and the found face region (connected component);
2) The user manually specifies the face bounding box (This step is unnecessary for most images);
3) A rough approximation of the profile contour is found. The algorithm constructs a "profile function" $x=x(y)$, where y varies along vertical direction, and x corresponds to the rightmost skin pixel in y row inside the face bounding box. If there is no skin pixel in this row, $x(y)$ is set to zero;
4) The profile function is smoothened using a 1D Gaussian filter to eliminate random noise (see FIG. 45 for an exemplary profile function).

The image is cropped such as to include only the profile function and scaled to a fixed height to allow easier subsequent processes.

2.2.3. Fiducial Points Detection

The fiducial points of the profile curve are detected by analyzing the shape of the profile function.

1) A nose tip is the global maximum of the profile function.

After the nose tip is detected, a part of the nose bridge is approximated as a line using strong edge pixels above the nose tip. The performance of separating skin from the background across the nose bridge is examined using different channels in HSV conversion of the original image. Furthermore, when the nose bridge line is too far away from the profile curve, it is recognized that skin detection would be failed, and the algorithm goes back to detect the face region using the area segmentation algorithm.

Figure 46:
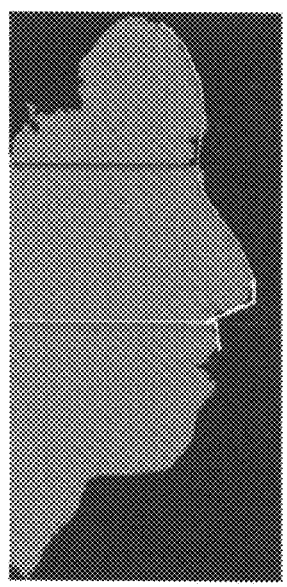
FIG. 46 illustrates detection of a nose bridge top and an under-nose point.

2) An upper point of forehead ("forehead top") is the most top skin pixel.
3) An upper part (from the forehead top to the nose tip) of the profile function $x=x(y)$ is approximated with a seventh degree polynominal (see FIG. 46). Bottom-up scanning of the polynominal is performed to find a position where a first derivative of the polynomial is less than a fixed threshold. This point corresponds to the nose bridge top;
4) Piecewise linear approximation is performed on the lower part (below the nose tip) of the profile function.
   a) Line segment's direction is calculated from the first 3 points of the function. b) The distance from the successive point to the current segment is calculated. c) If the calculated distance is too large (more then fixed threshold), a new segment is started and the process goes to step a). d) step (a) is performed.
5) Among joint-points of the line segments in a predetermined area, a joint-point having a large angle (about 90 degrees) between adjacent segments is found. This point corresponds to the "under nose point" (see FIG. 46).
6) For the points below "under nose point", the profile function is approximated with line segments estimated using an adaptive polyline fitting algorithm. Each step of this algorithm is as follows.
   a) New line segment direction is calculated from the first two points. b) A next point is added to the set of segment-approximated points. c) The segment direction is recalculated by least squares fitting all the points. d) A deviation of each point from the approximating segment is calculated. e) If any point is too far from the segment, the process goes to a). Otherwise, the process goes to b).

Figure 47:
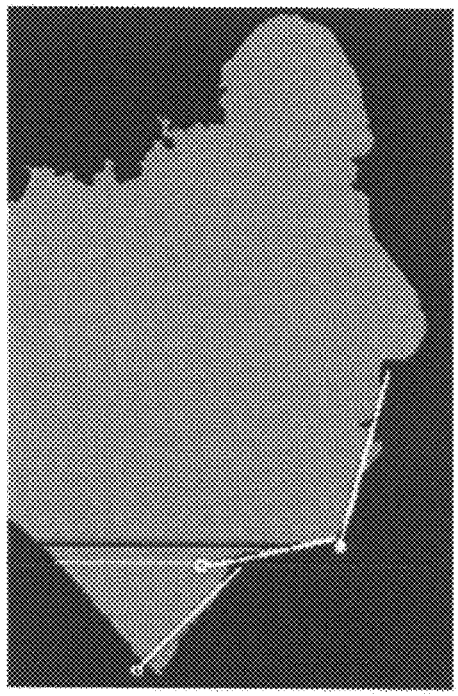
FIG. 47 illustrates detection of chin and neck fiducial points.

The chin and neck points are detected from the adaptive polyline fitting results (see the three points marked in FIG. 47). If the chin is too close to the nose tip, it is recognized that skin detection would be failed, and the algorithm goes back to redetect the face region.

Figure 48:
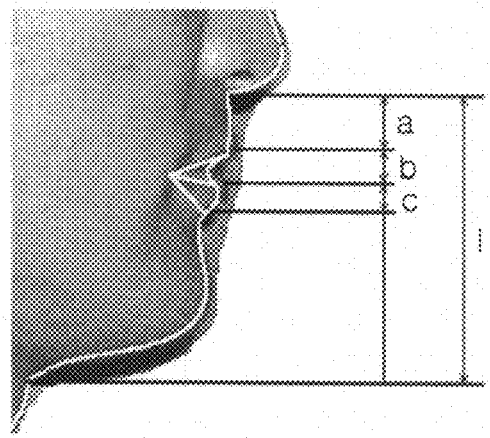
FIG. 48 illustrates estimation of lips fiducial points.

7) It is very difficult to find the upper and lower lip fiducial points with reliability, especially when imaging conditions are greatly varied. In this case, the fiducial points are reasonably approximated by judging the overall face size (see FIG. 48). Some segments in FIG. 48 are described below.
   a) "I" is the vertical distance from the "under nose point" to the neck start point.
   b) "a"=0.225*I.
   c) "b"=0.125*I.
   d) "c"=0.125*I.

Figure 49:
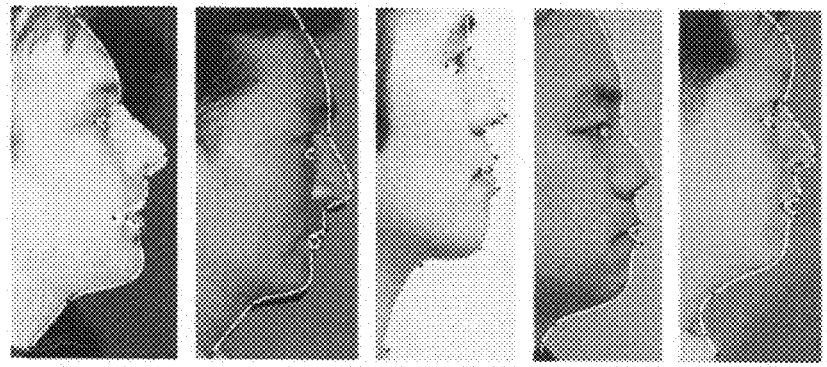
FIG. 49 illustrates automatically detected profile features (not including ear)

After the fiducial points are found the profile curve segments between the fiducial points are approximated with polynomials. The back and top of the head, together with the eyes, are not directly detected and are estimated from the reasonable proportions of the human head. All the resulting features are shown in FIG. 49.

1.2.4. Ear contour detection

Figure 50:
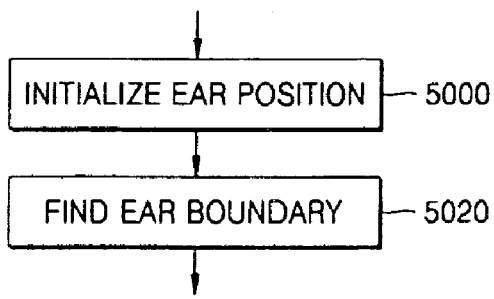
FIG. 50 is a flowchart of ear contour detection.

FIG. 50 is a flowchart of ear contour detection. The ear contour detection process includes initializing the ear position by matching a curve template with the profile image (operation 5000) and finding a more accurate ear boundary by deforming an initialized ear template using a contour following algorithm (operation 5020).

Figure 51:
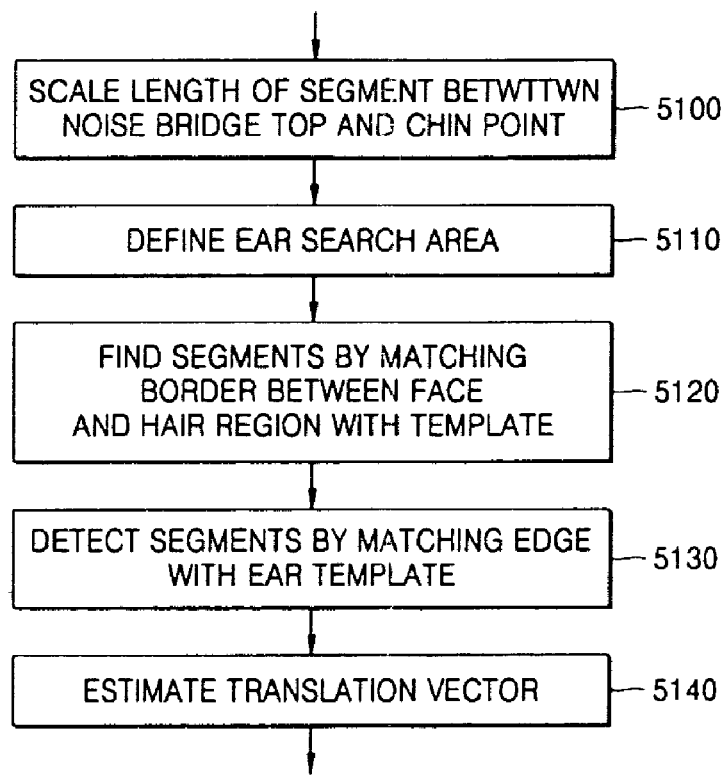
FIG. 51 is a flowchart of ear initialization.

FIG. 51 is a flowchart of ear initialization. Referring to FIG. 51, the ear initialization process includes: determining a translation vector of the ear template, rotating the original image such that the segment between the nose bridge top and the chin point becomes vertical, and scaling the length of the segment to a predetermined value (operation 5100); defining an ear search area (operation 5110); matching the border between the face region and hair region with the curve template to find corresponding sub-segments having similar shape from the two curves (operation 5120); detecting segments having similar shapes by matching an edge detected using an edge detector and the ear template if the length of the matching segments is smaller than a predetermined threshold value (operation 5130); and calculating the translation vector from the template segment to the matching image points using a least square algorithm (operation 5140).

Figure 52:
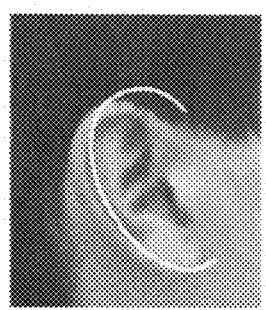
FIG. 52 illustrates a curve template used for profile ear detection.

The ear contour detection process will be described in detail. The ear contour detection process can be roughly divided into two steps. In a first step, the curve template (see FIG. 52) is matched with color or edge information, and the template is deformed to fit local image information.

Figure 53:
FIG. 53 illustrates a normalized image, calibration points, and an ear search area used for ear position initialization in ear contour detection.

In particular, in the ear position initialization step, the orientation and the scale of the original image are normalized. Two calibration points, i.e., the nose bridge top and the chin point, are selected for normalization. The original image is rotated such that the segment connecting the two points becomes absolutely vertical and scaled such that the distance between the two points has a fixed value. A priori rectangle is positioned to define the ear search area in the normalized image. The normalized image, the calibration points, and the search area are shown in FIG. 53.

Figure 54:
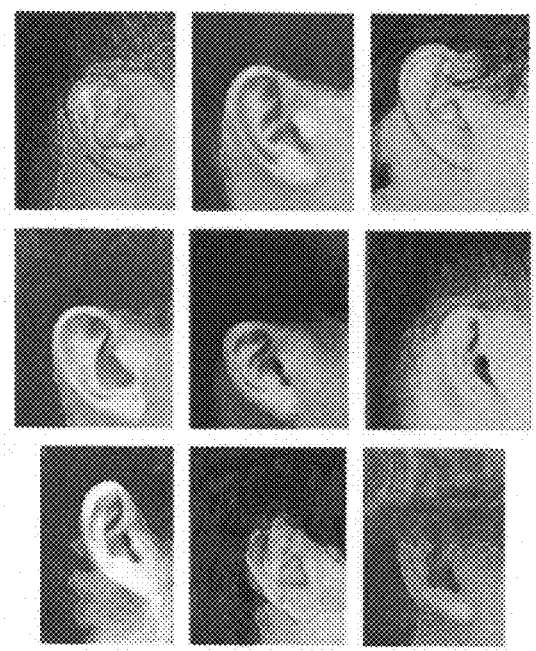
FIG. 54 illustrates a skin and hairs boundary in a face region near an ear area.
Figure 55:
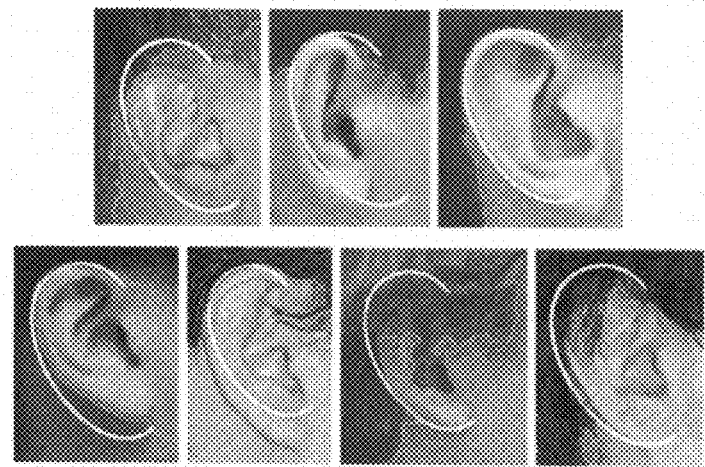
FIG. 55 illustrates the results of ear initialization using color information, in which red segments are matched with ear templates.

To find a translation vector for successfully initializing the position of the ear template, the results of skin detection are used. In general, the skin region boundary coincides with the ear boundary at some parts, as shown in FIG. 54. The template is matched with the skin region boundary using a simple curve matching algorithm based on the similarity of curve gradient information to find the segments on these two curves that match well. Next, the translation vector is estimated with the matching segments using the least square method. The results of ear position initialization are illustrated in FIG. 55. The segments that match with the template in the skin region boundary are marked in red.

Figure 56:
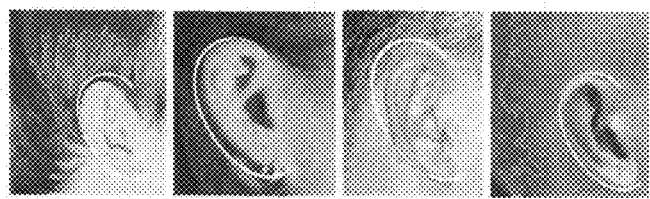
FIG. 56 illustrates the results of ear initialization using ear edge information, which can be performed when profile ear detection using only color information has failed.

In some cases, the skin region boundary may not coincide with the ear boundary, for example, when hair is too short or lightening is very strong (see FIG. 56). The algorithm used in the present invention can automatically detect such failure situations by evaluating the length of the matching segments and the position of the translated ear template in the search area. The ear position is initialized using local edge information.

The Nevatia-Batu edge detector is used to extract the edge information from a gray image. Long edge segments are tested to find only one edge segment that best matches with the ear template, using the same curve matching algorithm as used in previous ear initialization algorithm. Relative factors are used in combination for matching evaluation. The relative factors include the matched length in edge segments and segment-based ear template position in the search area.

It is experimentally proved that edge-based ear initialization is more robust than using the face region-based algorithm but is not accurate enough for finding initial segments on the ear boundary. Therefore, the edge-based algorithm is used to complement the face region-based algorithm, thereby enhancing the robustness of the algorithm as a whole. Several examples of edge-based ear initialization are illustrated in FIG. 56.

In a second step, the translated template is deformed to match with the ear boundary. Using ear boundary points obtained in the initialization step (segments from the face region boundary or the Nevatia-Batu edge), the template is fit to the ear according to a contour following scheme. Detailed procedures are as follows.

1) Starting from an ear template point that has already match with image ear boundary, record this point as $Cont_n$, where Cont is the ear template (sampled as 2D point list), and n is the index of this point in the list;
2) Find the first successive point satisfying the following constraint: some template points between $Cont_n$ and $Cont_{next}$ are far enough from the line least square fitted to the point set $\{Cont_i, i=n, \ldots, next\}$; next should be at least n+5; if next reaches the extreme point of the template, the contour following algorithm is terminated;
3) Rotate the segments from $Cont_n$ and $Cont_{next}$ in some range, centered at $Cont_n$; and match the rotated segments with local information to find a "best" angle having a maximum matching value; if no correct match is found in the angle range, the algorithm is terminated with a notice of a failure;
4) Rotate all template points after $Cont_n$ using the best angle, set n=next, go to step 1;

Matching evaluation between a segment and an image is performed based on a combination of two kinds of information. One is the local edge strength evaluated as the sum of intensity differences across the segment. The other information is segment similarity. In other words, the sum of intensity values of all pixels of the segment should do not greatly differ from that of the previous segment. If the result of the matching evaluation based on the two factors is "bad", it is determined that the matching is wrong.

Figure 57:
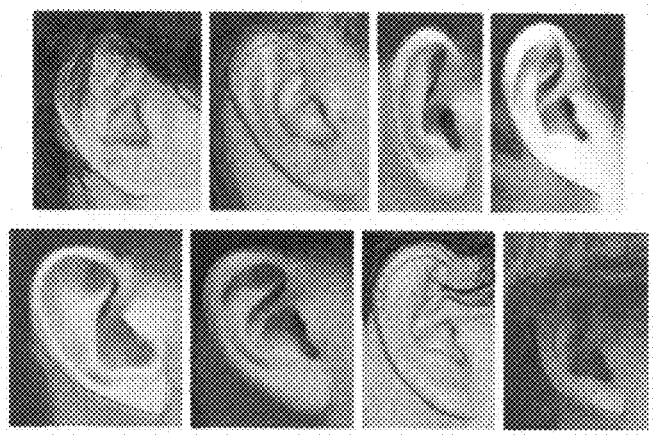
FIG. 57 illustrates the results of profile ear detection.
Figure 58:
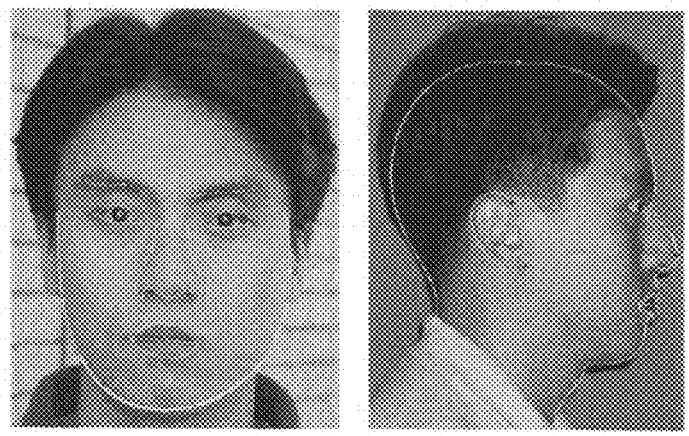
FIG. 58 illustrates input facial feature curves for model fitting.

The contour following algorithm is performed twice on the ear top and ear bottom. When the contour following algorithm is terminated with the notice of a failure, which occurs commonly because the ears are occluded by hair as illustrated in FIG. 57, the results of the initialization are directly used.

For the ear bottom, the template length may be not long enough to fit to the ear boundary, so the "tail" of the template is replaced with a long segment. The real bottom position of the ear is found by measuring the edge strength along the matched template. In some images, the ear boundary goes toward top from the bottom. This case can be detected using local edge information and the resulting ear boundary include a tail extending toward the top as shown in FIG. 57.

2. Head Model Fitting

A full set of face features extracted from frontal and profile photographs and/or 3D stereo depth map is obtained. Stereo depth extraction will be described later.

Figure 59:
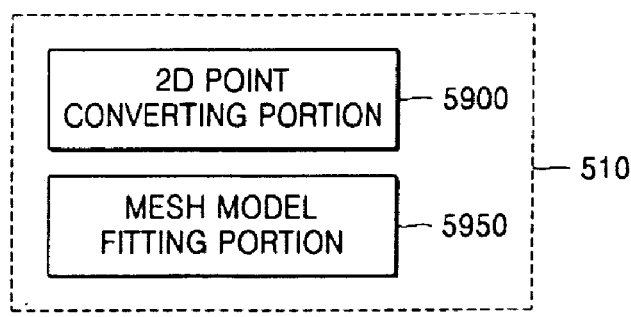
FIG. 59 is a block diagram of a face model fitting unit of FIG. 5.
Figure 60:
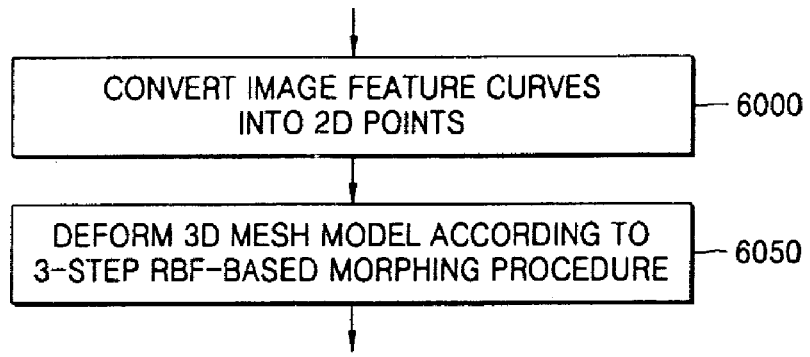
FIG. 60 is a flowchart of initial model fitting in the face model fitting unit.

FIG. 59 is a block diagram of the face model fitting unit 510 of FIG. 5. The face model fitting unit 510 includes a 2-dimensional (2D) point converting portion 5900 and a mesh model fitting portion 5950. FIG. 60 is a flowchart of initial model fitting in the face model fitting unit 510.

Initially, using the length ratios of feature points on the facial feature curve of the 3D genetic head model, feature polynominals detected in the image are converted into 2D points corresponding to features defined in the 3D generic head model (operation 6000). The 3D genetic mesh model is deformed using the detected features of the image and the feature points of the 3D generic mesh model according to a 3-step radial based function (RBF)-based morphing procedure (operation 6050).

The 3-step RBF-based morphing procedure is performed as follows. First, the X and Y coordinates of displaced model key points are set to corresponding image feature positions and the Z coordinate remains as in the generic mesh model to perform RBF interpolation on the frontal features. Secondly, the scale of the profile image is adjusted in consideration of the Y coordinates of the profile features, and profile features are used as input for RBF interpolation. Finally, RBF interpolation is performed using all available features.

RBF-based morphing may be performed such that vertices of the genetic mesh are displaced to corresponding 3D points acquired in a depth information recovery process.

The heat model fitting process will be described in detail. Detected face features are used to deform the genetic model to fit to the input image. To this end, the facial features acquired in the feature detection step are converted into the displacements of points that correspond to the features predefined in the generic model, and all vertices in the model are displaced using a data interpolation algorithm so that the generic model is deformed. The correspondence between the detected features (curves and points) and the model vertices should be set manually beforehand. The correspondence for a certain generic model is fixed, so there is required no user interaction.

Figure 61:
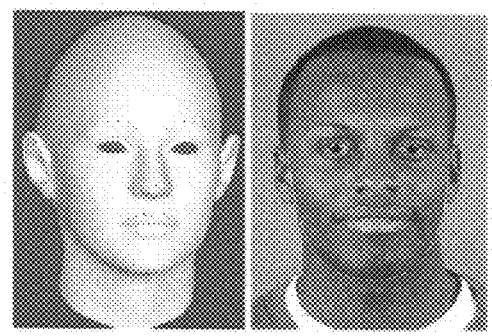
FIG. 61 illustrates key points extracted from frontal feature curves.
Figure 62:
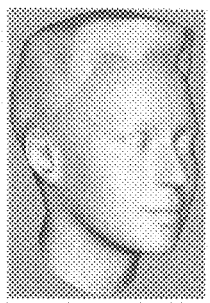
FIG. 62 illustrates generic (upper row) and created face models (lower row)
Figure 62:
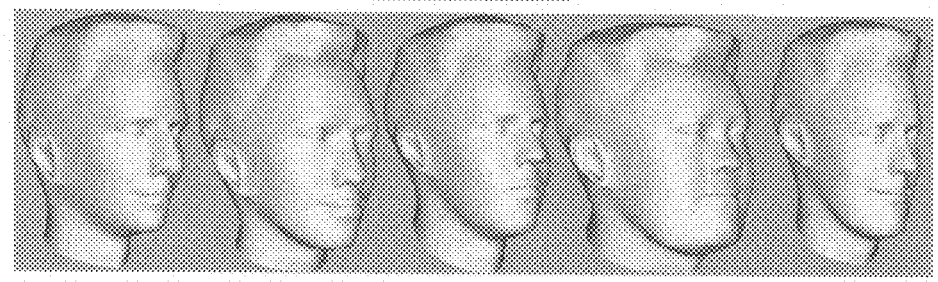

A process of setting up the correspondence for one feature curve will be described. The "key" vertices on the model and the distributed positions along facial feature curves are shown in FIG. 61. The facial features on the generic mesh model corresponding to the face feature curves detected in the input image are shown. The feature points are sampled from both the curves at the same length ratios. This process is repeated twice on the profile features to generate two sets of 2D displacements of the model "key" points.

The 3D displacements of "key" vertices according to the corresponding image feature points are determined. In a straightforward method, x and y displacements are obtained from the frontal features and z displacements are obtained from the profile features. However, plausible results cannot be obtained with this method because some frontal features (lower chin part, top and back head parts, etc.) lack y-positional information and there are conflicts between the front and profile feature positions. Data conflicts are inevitable because the input picture images cannot be simultaneously taken and the orientation and the expression of the face always vary at least slightly. Even if the frontal and profile pictures can be simultaneously taken, usually the frontal and profile pictures are not standard. In other words, it is difficult to align the focal axes of two cameras to be perpendicular to each other.

To solve these problems, the RBF-based three-step morphing procedure is used.

2.1. Rbf Data Interpolation

A RBF-based data interpolation method used in the present invention will be described briefly. If two corresponding data set, $\{\bar{u}_i, i=1, \ldots, N\} \subset R^3$ and $\{\bar{u}_i', i=1, \ldots, N\} \subset R^3$, which represent 3D samplings before and after the morphing procedure, respectively, are input, $f(\bar{p})$, deformation function in 3D space, is determined as follows:

$$f(\bar{p}) = \bar{c}_0 + [\bar{c}_1 \ \bar{c}_2 \ \bar{c}_3]\bar{p} + \sum_{i=1}^{N} \bar{\lambda}_i \varphi_i(|\bar{p} - \bar{u}_i|) \quad (8)$$

where $\bar{p}$ is any 3D vector;

$\psi_i$ is the RBF for $\bar{u}_i$, wherein in an embodiment $\psi_i(r) = e^{-r/K_i}$, where $K_i$ is a predetermined coefficient that defines the falloff of $\bar{u}_i$'s displacement influence;

$\bar{c}_0, \bar{c}_1, \bar{c}_2, \bar{c}_3$, and $\bar{\lambda}_i, i=1, \ldots, N$ are coefficients, which are all 3D points determined by equation (9) below:

$$\left( \begin{array}{l} (f(\bar{u}_i) = \bar{u}_i')_{i=1,\ldots N} \\ \sum_{i=1}^{N} \bar{\lambda}_i = 0 \\ \sum_{i=1}^{N} \bar{u}_{i,x} \bar{\lambda}_i = 0 \\ \sum_{i=1}^{N} \bar{u}_{i,y} \bar{\lambda}_i = 0 \\ \sum_{i=1}^{N} \bar{u}_{i,z} \bar{\lambda}_i = 0 \end{array} \right) \quad (9)$$

Using this data interpolation method, the deformation function $f(\bar{p})$ can be determined provided that the correspondence of "key" points between the generic model and the specific person is established. Accordingly, a perfect specific model for the input image can be generated by substituting all generic model vertices into the function $f(\bar{p})$.

2.2 Three-Step Morphing Procedure

The model fitting process will be described in detail.

1) RBF interpolation is performed using frontal features. The X and Y coordinates of displaced model key points are set to corresponding image feature positions, and the Z coordinates remain as in the generic model. In this step, the frontal features between the model and the image are perfectly matched with each other. This step is necessary for accurate texture mapping.

2) RBF interpolation is performed using profile features. The Y and Z coordinates of profile key points are set to their corresponding profile image positions, and the X coordinates remain the same as in the generic model. During this step we only determine the Z values for all model vertices. Conflicts between the frontal and profile features, which are likely to occur at nose tip, nose bridge top and lips, can be eliminated by scaling and translating the profile feature curves such that the Y coordinates fit to the corresponding points of the morphed model.

3) Finally, all the key points are used as RBF interpolation input to determine the resulting head shape. In this step the profile key points remain their positions in the interpolation resulting model of step 2. As for the frontal key points, we set their Z coordinates according to step-2 result, and set X and Y coordinates to step-1 result. If a near front image is available, RBF interpolation can be performed once more to take 3D points reconstructed using stereo information as input data. Exemplary generated face modes are shown in FIG. 63.

3. Texture Generation

The generation of a high quality texture for the head model is more important than model fitting since texture makes a major contribution to the visual appearance of the model. Frontal and profile textures are mapped to the model, and a multi-resolution spline texture combination scheme is used to combine different photographs. In addition, an artificial texture is generated for, for example, the chin or neck areas occluded by the jaw and the back side of ears.

Figure 63:
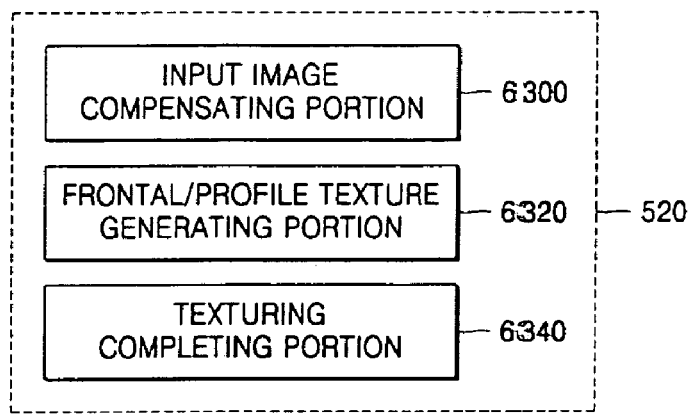
FIG. 63 is a block diagram of a texture generating unit of FIG. 5.
Figure 64:
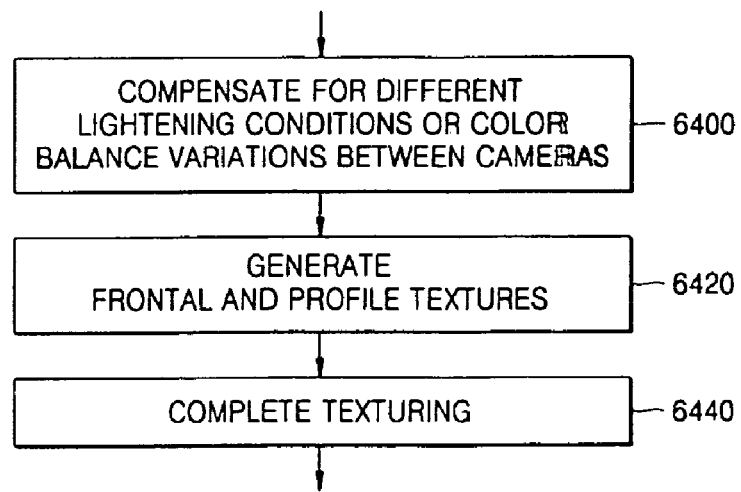
FIG. 64 is a flowchart of texture generation.

FIG. 63 is a block diagram of the texture generating unit 520 of FIG. 5. The texture generating unit 520 includes an input image compensating portion 6300, a frontal/profile texture generating portion 6320, and a texturing completing portion 6340. FIG. 64 is a flowchart of texture generation. A texture generating process will be described with reference to FIGS. 63 and 64.

The input image compensating portion 6300 performs color correction on an input image to compensate for different lightening conditions or color balance variations between cameras (operation 6400). The frontal/profile texture generating portion 6320 generates frontal and profile textures by mapping the frontal and profile images onto a public UV plane based on the match between 3D model vertices and projected 2D positions on the photograph (operation 6420). The texturing completing portion 6040 combines the frontal, profile, and artificial textures using a multi-resolution spline algorithm to complete texturing (operation 6440). The texture generation process will be described in detail.

3.1. Texture Coordinate Mapping and Texture Generation

In order to combine the textures obtained at different viewing angles, a public UV plane containing the texture coordinates of model vertices is required. This public UV plane is a 2D plane where the points are matched with 3D model positions. The plane has a normalized coordinate space expressed by $M = \{(u,v) | u, v \in [0,1]\}$.

To ensure even distribution of model vertices over the texture coordinate space, the UV plane is created by spherical mapping in consideration of the sphere-like shape of the human head. The generated space is manually modified to solve a problem of overlapping, especially in ear areas, on the UV plane. The UV plane is specific to individual models and remains constant once the correspondence has been established, so no further user interaction is required.

To create a textured model, it is required to map the face image onto the UV plane. Since the model has been fitted to the image features, the correspondence between model vertices and the image positions can be easily obtained. Therefore, the image positions can be easily mapped to the texture coordinates on the UV plane.

Figure 65:
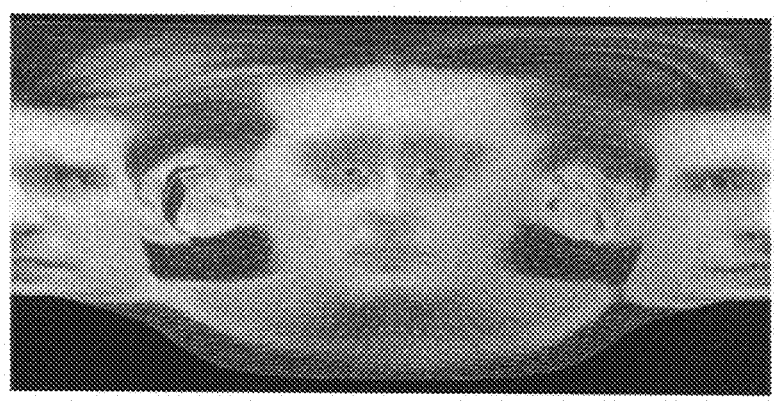
FIG. 65 illustrates a frontal texture image on a UV plane.
Figure 66:
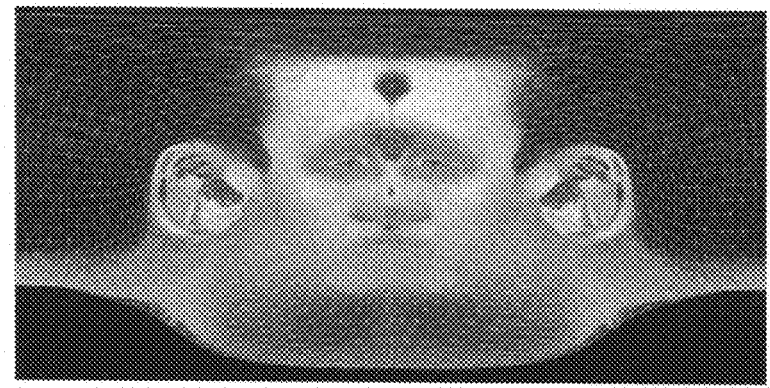
FIG. 66 illustrates a profile texture image on a UV plane.

FIGS. 65 and 66 are frontal and profile textures images, respectively, on the UV planes, in which overlapping texture coordinates appear.

3.3. Texture Blending

In this step, the frontal and profile texture images in UV plane and the artificial skin texture for ear are blended to generate one image, which will be rendered to the 3D model surface. For each point p∈{(x,y)|x,y ∈[0,1]} in UV plane, its color in the blended image can be calculated using equation (10) below:

$$C(p) = k_f(p)c_f(p) + k_s(p)c_s(p) + k_{art}(p)c_{art}(p) \quad (10)$$

where $c_f$, $c_s$, $c_{art}$ are the colors of point p for frontal, profile and artificial skin textures, respectively; $k_f$, $k_s$, $k_{art}$ are weights for the different textures and are normalized to satisfy $k_f(p)+k_s(p)+k_{art}(p)=1$ for every p. The weights for texture blending are calculated using a multi-resolution spline algorithm. Based on Gaussian pyramid decomposition, the well-known image blending algorithm used in the present invention can achieve smooth transition between images without blurring or degrading finer image details. The algorithm can be used in blending boundaries having any shapes.

3.4. Artificial Skin Texture

Artificial textures for filling the chin and neck areas are generated based on color statistics of nearby regions in the profile area. Infrequent colors are discarded, the color of each pixel in the regions is chosen based on the clipped color statistics, and uneven grains are removed by Gaussian smoothening.

Figure 67:
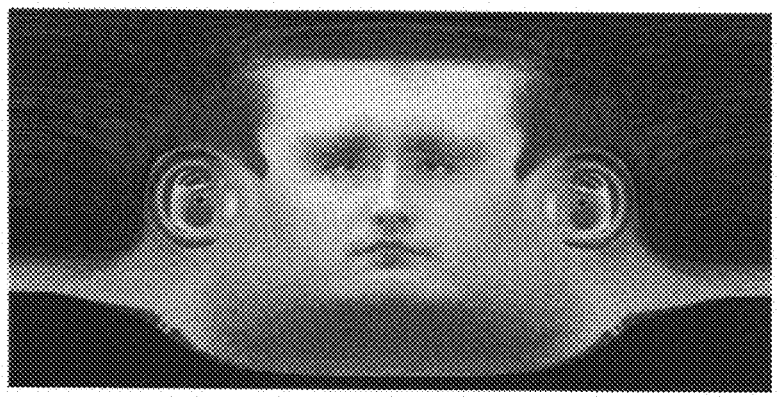
FIG. 67 illustrates a final texture image obtained from an input image and an artificial texture.
Figure 68:
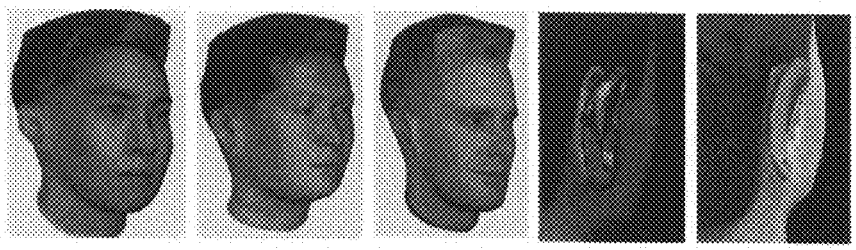
FIG. 68 illustrates improved images obtained using a textured model and an artificial ear texture.

The final textured image is shown in FIG. 67. Exemplary textured models are shown in FIG. 68. The back side of the ear, not mapped with overlapping texture, is noticeable. The last two pictures in FIG. 68 show an artificially textured ear part and a non-textured ear part, respectively.

4. 3D Reconstruction Using Stereo Image Pair

In most cases, the results of 3D reconstruction are reasonable when using only a frontal image or additional profile image. However, the algorithm cannot work properly when an input face image to be reconstructed appears untypical, i.e. when the subjective greatly differs from the generic head model.

Figure 69:
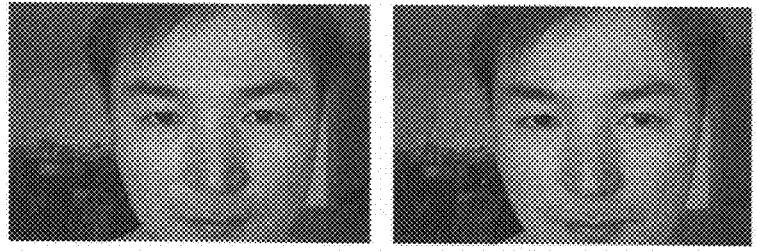
FIG. 69 illustrates an exemplary facial stereo pair.

In such a case, to further refine the head model, a stereo analysis-based module is incorporated into the system. Two or more facial images captured at slightly different viewing angles can be analyzed using a specialized stereo reconstruction algorithm to produce more precise 3D information for visible parts of the head. An exemplary stereo image pair captured for this purpose is shown in FIG. 69.

Figure 70:
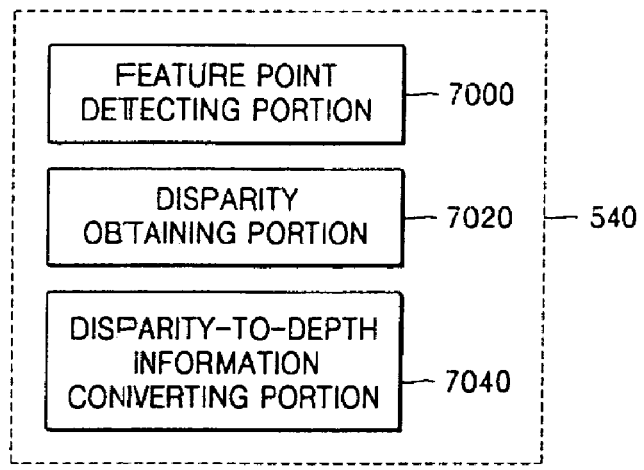
FIG. 70 is a block diagram of a depth information generating unit of FIG. 5.
Figure 71:
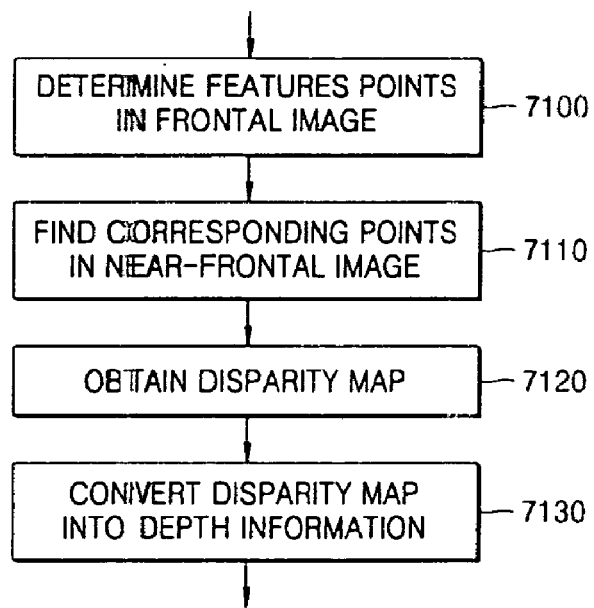
FIG. 71 is a flowchart of depth information generation from frontal and near-frontal images.

FIG. 70 is a block diagram of the depth information generating unit 540 of FIG. 5. The depth information generating unit 540 includes a feature point detecting portion 7000, a disparity obtaining portion 7020, and a disparity-to-depth information converting portion 7040. FIG. 71 is a flowchart of depth information generation from frontal and near-frontal images. The depth information generation process will be described with reference to FIGS. 70 and 71.

The feature point detecting portion 7000 determines image features points in the frontal image (operation 7100), and performs model-based Lucas-Kanade tracking on the feature points to find corresponding points in the near-frontal image (operation 7110).

The disparity obtaining portion 7020 obtains a dense disparity map by data interpolation using the matching correspondence (operation 7120). Finally, the disparity-to-depth information converting portion 7040 converts the disparity map into the depth information (operation 7130).

The conversion from the disparity map to the depth information is achieved based on a difference value between the maximum and minimum disparity values. The difference value is divided by the head width and multiplied by a predetermined constant to obtain a coefficient. The depth value of a given pixel is obtained by multiplying the coefficient by a value obtained by subtracting the minimum disparity value from a measured disparity value. These processes will be described in detail.

4.1 Disparity Estimation from Stereo Image Pair

Stereo matching by feature tracking will be described. The key concept of 3D object reconstruction is "stereo matching"—the process of finding the "same" points across stereo images (here "same" means that these 2D projections correspond to the unique 3D point). After stereo matching, the 3D positions can be recovered.

Despite the simplicity of the underlying idea, stereo matching is a very complicated task. Many problems arise while stereo matching is performed on stereo images with significant dissimilarity. Furthermore, stereo matching causes a computationally complex problem because all possible correspondences across stereo images have to be calculated to complete the matching process.

However, according to the present invention, desirable matching results can be obtained in a face modeling process by using the following ideas. Since the view angles of stereo pairs are not significantly different (frontal and near frontal), stereo matching can be treated as a process of objects tracking between the stereo images. Accordingly, a feature-tracking algorithm can be utilized.

Most feature-tracking algorithms work on a set of separate points selected from a first image. The goal is to track the positions of these points in consecutive images. In this case, tracking and matching are identical processes. Compared with complete point-by-point epipolar matching, feature tracking may lead to extra mismatches, but does not require a rectification stage. All points can be independently processed to construct any epipolar geometry. Therefore, this feature tracking can be used when using an uncalibrated camera. For these reasons, stereo matching using feature tracking is performed in an embodiment. The used tracking algorithm will be described.

With the assumption that A(x,y) and B(x,y) are two 2D grayscale images, an image point A(px, py) in a first image is considered. The goal of feature tracking is to find the location of B(px+vx, py+vy) in a second image such that A(px, py) and B(px+dx, py+dy) are "similar". A vector v=[vx vy] is the image velocity and is also known as optical flow at point [px, py]. The image velocity v is defined as a vector that minimizes the residual function ε in the $(2\omega_x+1)\times(2\omega_y+1)$ vicinity of point [px, py]:

$$\varepsilon(v) = \varepsilon(v_x, v_y) = \sum_{x=p_x-\omega_x}^{p_x+\omega_x} \sum_{y=p_y-\omega_y}^{p_y+\omega_y} (A(x,y) - B(x+v_x, y+v_y))^2 \quad (11)$$

The velocity, recorded as $v_{opt}$, minimizing the above residual function can be found using the following standard Lucas-Kanade equation:

$$v_{opt} = G^{-1}b \quad (12)$$

where $$G \equiv \sum_{x=p_x-\omega_x}^{p_x+\omega_x} \sum_{y=p_y-\omega_y}^{p_y+\omega_y} \begin{bmatrix} I_x^2 & I_x I_y \\ I_x I_y & I_y^2 \end{bmatrix}, \quad b \equiv \sum_{x=p_x-\omega_x}^{p_x+\omega_x} \sum_{y=p_y-\omega_y}^{p_y+\omega_y} \begin{bmatrix} \delta I \cdot I_x \\ \delta I \cdot I_y \end{bmatrix} \quad (13)$$

$$I_x(x,y) = \frac{\partial A(x,y)}{\partial x} = \frac{A(x+1,y) - A(x-1,y)}{2} \quad (14)$$

$$I_y(x,y) = \frac{\partial A(x,y)}{\partial y} = \frac{A(x,y+1) - A(x,y-1)}{2} \quad (15)$$

$$\delta I(x,y) \equiv A(x,y) - B(x,y) \quad (16)$$

After the 3D reconstruction, the generic model is fitted to the image using the above-described model fitting algorithm.

As described above, in an apparatus and method for image-based photorealistic 3D face modeling according to the present invention, data obtained using a relatively cheap device, such as a digital camera, can be processed in an automated manner, and satisfactory results can be obtained even from imperfect input data. In other words, according to the present invention, facial features can be extracted in an automated manner, and a robust "human-quality" face analysis algorithm is used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for creating a 3D photorealistic head model, the method being executed by a processor and comprising:
   (a) detecting frontal and profile features in input frontal and profile images, the detecting frontal and profile features comprising:
       detecting a face region, the detecting a face region comprising initializing the largest skin-colored connected component as the face region, and when there are two largest connected components having similar sizes, the initializing includes selecting one of the two largest connected components that is closer to the center of the image as the face region, and
       detecting a profile region by classifying pixels into skin color pixels and non-skin color pixels and selecting the largest skin-colored connected component as the profile region;
   (b) generating a 3D head model by fitting a 3D generic model using the detected face region and the detected profile region;
   (c) generating a realistic texture from the input frontal and profile images; and
   (d) mapping the texture onto the 3D head model.

2. The method of claim 1, wherein (b) generating the 3D head model further comprises generating depth information from the frontal image and a near-frontal image, the generic model is fitted using the facial features to determine the 3D shape of the particular face, and the generated 3D head model is fitted using the depth information.

3. The method of claim 2, wherein the generating the depth information from the frontal and near-frontal images comprises:
   determining features points in the frontal image;
   performing model-based Lucas-Kanade tracking on the feature points to find corresponding points in the near-frontal image;
   obtaining a dense disparity map by data interpolation using matching correspondence; and
   converting the disparity map into the depth information.

4. The method of claim 3, wherein the converting the disparity map into the depth information comprises:
   obtaining a difference value between maximum and minimum disparity values;
   determining a coefficient by dividing the difference value by a head width and multiplying the divided result by a predetermined constant; and
   obtaining the depth value of a pixel by multiplying the coefficient by a value obtained by subtracting the minimum disparity value from a measured disparity value.

5. The method of claim 1, wherein (c) further comprises blending an artificial texture.

6. The method of claim 1, wherein (a) detecting the frontal features further comprises:
   detecting a skin region;
   detecting eye bounding boxes;
   detecting irises; and
   normalizing the frontal image.

7. The method of claim 6, wherein the detecting the skin region is performed using a pre-trained maximum likelihood Bayesian classifier, which classifies image pixels into skin pixels and non-skin pixels in a normalized r-g chrominance color space.

8. The method of claim 7, wherein the detecting the face region further comprises:
   initializing and evolving an ellipse by displacing boundary points of the ellipse based on the initialized face region until the ellipse is stabilized; and
   determining a bounding box of the stabilized ellipse as the face region.

9. The method of claim 8, wherein (ii) initializing and evolving the ellipse comprises:
   defining a rectangular probe centered at a boundary point of the ellipse based on the initialized face region;
   calculating the number of skin pixels that lie inside both the probe and the ellipse;
   moving the boundary point of the ellipse a predetermined distance inwards if the calculated number of skin pixels is less than a predetermined threshold;
   calculating the number of skin pixels that lie inside the probe and outside ellipse if the calculated number of skin pixels is not less than the predetermined threshold value; and
   moving the boundary point of the ellipse a predetermined distance outwards if the calculated number of skin pixels that lie inside the prove and outside ellipse is greater than a predetermined threshold.

10. The method of claim 7, wherein the detecting the eye bounding boxes comprises:
    generating a blurred image by low-pass filtering;
    obtaining an image by subtracting the blurred image from the original image;
    generating a new image by calculating the mean value of each pixel and its neighboring pixels in the obtained image and binarizing the new image using a predetermined threshold value;
    finding connected segments as eye candidates; and
    determining the eye bounding boxes by evaluating the eye candidates in terms of shape, size, and relative position.

11. The method of claim 6, wherein the detecting the irises comprises detecting the irises within the eye bounding boxes in a red channel image.

12. The method of claim 11 further comprising detecting the centers and radii of the irises, the detecting the centers and radii of the irises comprising:
- comparing the number of pixels having maximum brightness values in each of the eye bounding boxes in the red channel image with a threshold value to determine whether a highlight exists;
- initializing the center of mass of the darkest pixels as the center of the iris if no highlight is found;
- initializing the center of a high contrast region near a highlight as the center of the iris if the highlight exists;
- enlarging an initial circle at the center of the iris and measuring gradients of the pixels along the circle; and
- enlarging the initial circle at the center of the iris and repeatedly measuring the gradients of the pixels along the circle; and
- selecting a region having the largest gradient as the center of the iris and determining the radius of the iris.

13. The method of claim 6, wherein the normalizing the frontal image comprises rotating the frontal image such that the line between the centers of the irises becomes horizontal and scaling the frontal image to a predetermined resolution.

14. The method of claim 1, wherein (a) detecting the frontal features comprises at least one of:
- detecting eye contours;
- detecting eyebrows;
- detecting a lips contour;
- detecting a nose contour; and
- detecting a chin and cheeks contour.

15. The method of claim 14, wherein the detecting the eye contours comprises approximating the eye contours using two polynomials for upper and lower eye contours, the approximating the eye contours comprising:
- predetermining a search area according to the center and radius of the iris;
- selecting pixels on each horizontal scan line in a red channel image in the search area, in which local minimums or brightness abruptly change, as left and right eyelid points;
- selecting the leftmost and rightmost points among the remaining eyelid points as eye corners;
- estimating an upper eyelid curve using points on a line connecting the eye corners by a minimum square method; and
- estimating a lower eyelid curve using the selected eye corners and a lower point of the iris.

16. The method of claim 14, wherein the detecting the eyebrows comprises approximating the eyebrows using a polynomials that fits dark pixels in a predetermined area above the eye bounding box after adaptive binarization.

17. The method of claim 14, wherein the detecting the lips contour comprises detecting upper and lower lips, the detecting the upper and lower lips comprising:
- initializing a mouth rectangle;
- refining the mouth rectangle to be smaller by analyzing the first order and second order moments of non-skin color pixels;
- generating a lip function image and calculating the probability that each pixel in the refined mouth rectangle belongs to a lip or skin;
- initializing a lips contour by an ellipse by measuring the second-order central moments of pixels having large lip function values;
- dynamically moving the lips contour by inward and outward forces; and
- generating a polynomials expressing the lips contour by approximation using moved contour points.

18. The method of claim 17, wherein the outward force is a force moving contour points to the boundary between the lips and skin, and the inward force consists of an internal shaping force, which shapes the contour to be elliptical, and an internal smoothening force, which is determined by predetermined factors including a force suppressing contour points from being moved beyond the boundary.

19. The method of claim 14, wherein the detecting the nose contour comprises detecting nose sides, the detecting the nose sides comprising:
- performing matching with a temperate having a predetermined shape on an edge image in a predetermined search area;
- selecting among detected candidates having large matching values a pair of candidates that satisfy the requirement for symmetry and determining the selected pair of candidates as wing positions; and
- expressing each of the nose sides using a polynominal that is fitted to detected nose wing templates and three points interpolated between the nose wing and eye corners with predetermined coefficients.

20. The method of claim 14, wherein the detecting the chin and cheeks contour comprises:
- calculating a gradient vector field on a red channel image;
- positioning an initial contour template in a face region defined by two polynominal curves crossing at a chin point;
- expanding the chin and cheeks contour outward until the chin and cheek contour reaches strong edges along the tangents of the curves; and
- stopping expanding the chin and cheeks contour when the chin and cheek contour has reached the strong edges along the tangents of the curves.

21. The method of claim 1, wherein (a) detecting the profile features further comprises:
- detecting a profile curve; detecting fiducial points; and detecting an ear contour.

22. The method of claim 21, wherein, when there are two largest connected components having similar sizes, one of the two largest connected components that is closer to the center of the image is selected as the profile region.

23. The method of claim 21, wherein the detecting the profile curve comprises detecting the rightmost boundary of a face region in a user-specified bounding box defined from the frontal image as a profile curve.

24. The method of claim 21, wherein the detecting the ear contour comprises:
- initializing the ear position by matching a curve template with the profile image; and
- finding a more accurate ear boundary by deforming an initialized ear template using a contour following algorithm.

25. The method of claim 24, wherein the initializing the ear position comprises:
- rotating the original image such that a segment between a nose bridge top and a chin point becomes vertical and scaling the length of the segment to a predetermined value;
- defining an ear search area;
- matching the border between the profile region and a hair region with the curve template to find corresponding sub-segments having similar shape from the two curves;

detecting segments having similar shapes by matching an edge detected using an edge detector and the ear template if the length of the matching segments is smaller than a predetermined threshold value; and calculating a translation vector from the template subsegment to the matching image points with a least square algorithm.

26. The method of claim 1, wherein the fitting the generic model in (b) comprises:

converting feature curves detected in the images into 2D points corresponding to features defined in the 3D generic model using the length ratios of feature points on a facial feature curve of the 3D generic model; and fitting the 3D generic model by 3-step radial based function (RBF)-based morphing based on the correspondences between the images features and the feature points of the 3D generic model.

27. The method of claim 26, wherein the 3-step RBF-based morphing comprises:

setting X and Y coordinates of displaced model key points to corresponding image feature points and remaining Z coordinate as in the 3D generic model to perform RBF interpolation on the frontal features;

adjusting the scale of the profile image in consideration of the profile features and using scaled profile features as input for RBF interpolation while constraining their X coordinates to remain at their positions in the generic model; and performing RBF interpolation on both frontal and profile features using the Z coordinates obtained in previous step.

28. The method of claim 27, wherein the 3-step RBF-based morphing is performed such that vertices of the generic mesh are displaced to corresponding 3D points acquired in a depth information recovery process.

29. The method of claim 1, wherein (c) generating the realistic texture comprises:

performing color correction on the input images to compensate for different lightening conditions or color balance variations between cameras;

generating frontal and profile textures by mapping the frontal and profile images onto a public UV plane based on the correspondence between 3D model vertices and projected 2D positions; and combining the frontal and profile textures and an artificial texture using a multi-resolution spline algorithm to complete texturing.

30. An apparatus for creating a 3D photorealistic head model, the apparatus comprising:

a face feature detecting unit receiving input frontal and profile images, and including a face region initializing portion that initializes the largest skin-colored connected components as a face region, wherein when there are two largest connected components having similar sizes, the initializing includes selecting one of the two largest connected components that is closer to the center of the image as the face region, and a profile feature detecting portion that detects profile features, and includes a profile region detecting portion that detects a profile region by classifying pixels into skin color pixels and non-skin color pixels and selecting the largest skin-colored connected component as the profile region;

a face model fitting unit generating a 3D head model by fitting a 3D generic model using the detected facial features;

a texture generating unit generating a realistic texture from the input frontal and profile images; and a mapping unit mapping the texture onto the 3D head model generated in the face model fitting unit.

31. The apparatus of claim 30, wherein the face model fitting unit comprises a depth information generating portion extracting depth information from the frontal image and a near-frontal image and generates the 3D head model by fitting the generic model using the facial features detected in the face feature detecting unit and the depth information generated in the depth information generating portion.

32. The apparatus of claim 31, wherein the depth information generating unit comprises;

a feature point detecting portion determining feature points in the frontal image and finding corresponding feature points in the near-frontal image;

a disparity obtaining portion obtaining a dense disparity map by data interpolation using matching correspondence; and a disparity-to-depth information converting portion converting the disparity map into the depth information.

33. The apparatus of claim 30, wherein the texture generating unit blends the realistic texture and an artificial texture.

34. The apparatus of claim 30, wherein the face feature detecting unit comprises:

A frontal feature detecting portion detecting the frontal features; and a profile feature detecting portion detecting the profile features.

35. The apparatus of claim 34, wherein the frontal feature detecting portion comprises:

a skin region detecting portion detecting a skin region;

a face region detecting portion detecting a face region;

an eye bounding boxes detecting portion detecting eye bounding boxes;

an iris detecting portion detecting irises; and a frontal image normalizing potion normalizing the frontal image.

36. The apparatus of claim 35, wherein the skin region detecting portion detects the skin region using a pre-trained maximum likelihood Bayesian classifier, which classifies image pixels into skin pixels and non-skin pixels in a normalized r-g chrominance color space.

37. The apparatus of claim 35, wherein the face region detecting unit comprises:

a the face region initializing portion;

an ellipse stabilizing portion initializing and evolving an ellipse by displacing boundary points of the ellipse based on the initialized face region until the ellipse is stabilized; and a face region determining portion determining a bounding box of the stabilized ellipse as the face region.

38. The apparatus of claim 35, wherein the eye bounding boxes detecting portion comprises:

a blurred image generating portion generating a blurred image by low-pass filtering;

an image binarizing portion generating a new image by calculating the mean value of each pixel and neighboring pixels in an image obtained by subtracting the blurred image from the original image and binarizing the new image using a predetermined threshold value;

an eye candidate searching portion finding connected segments in the image binarized in the image binarizing portion as eye candidates; and an eye bounding box determining portion determining the eye bounding boxes by evaluating the eye candidates in terms of shape, size, and relative position.

39. The apparatus of claim 35, wherein the iris detecting portion detects the irises within the eye bounding boxes in a red channel image.

40. The apparatus of claim 39, wherein the iris detecting portion comprises:
a highlight searching portion determining whether a highlight exists by comparing the number of pixels having maximum brightness values in each of the eye bounding boxes in the red channel image with a threshold value;
an iris center initializing portion initializing the center of mass of the darkest pixels as the center of the iris if no highlight is found and initializing the center of a high contrast region near a highlight as the center of the iris if the highlight exists;
an iris center/radius measuring portion repeatedly measuring gradients of the pixels along an initial circle at the center of the iris while enlarging the initial circle; and
an iris determining portion determining a region having the largest gradient as the center of the iris and the radius of the iris.

41. The apparatus of claim 35, wherein the frontal image normalizing portion normalizes the frontal image by rotating the frontal image such that the line between the centers of the irises becomes horizontal and scaling the frontal image to a predetermined resolution.

42. The apparatus of claim 34, wherein the frontal feature detecting portion further comprises at least one of an eye contours detecting portion, an eyebrows detecting portion, a lips contour detecting portion, a nose contour detecting portion, and a chin and cheeks contour detecting portion.

43. The apparatus of claim 42, wherein the eye contours detecting portion approximates the eye contours using two polynominals for upper and lower eye contours, the approximating the eye contours comprising:
predetermining a search area according to the center and radius of the iris;
selecting pixels on each horizontal scan line in a red channel image in the search area, in which local minimums or brightness abruptly change, as left and right eyelid points;
selecting the leftmost and rightmost points among the remaining eyelid points as eye corners;
estimating an upper eyelid curve using points on a line connecting the eye corners by a minimum square method; and
estimating a lower eyelid curve using the selected eye corners and a lower point of the iris.

44. The apparatus of claim 42, wherein the eyebrows detecting portion detects the eyebrows by approximation using a polynominal that fits dark pixels in a predetermined area above the eye bounding box after adaptive binarization.

45. The apparatus of claim 42, wherein the lips contour detecting portion detects upper and lower lips, the detecting the upper and lower lips comprising:
initializing a mouth rectangle;
refining the mouth rectangle to be smaller by analyzing the first order and second order moments of non-skin color pixels;
generating a lip function image and calculating the probability that each pixel in the refined mouth rectangle belongs to a lip or skin;
initializing a lips contour by an ellipse by measuring the second-order central moments of pixels having large lip function values;
dynamically moving the lips contour by inward and outward forces; and
generating a polynominal expressing the lips contour by approximation using moved contour points.

46. The apparatus of claim 42, wherein the nose contour detecting portion detects nose sides, the detecting the nose sides comprising:
performing matching with a temperate having a predetermined shape on an edge image in a predetermined search area;
selecting among detected candidates having large matching values a pair of candidates that satisfy the requirement for symmetry and determining the selected pair of candidates as wing positions; and
expressing each of the nose sides using a polynominal that is fitted to detected noise wing templates and three points interpolated between the nose wing and eye corners with predetermined coefficients.

47. The apparatus of claim 42, wherein the chin and cheeks contour detecting portion comprises:
a gradient calculating portion calculating a gradient vector field on a red channel image;
a chin and cheeks contour expanding portion positioning an initial contour template in a face region defined by two polynominal curves crossing at a chin point and expanding the chin and cheeks contour outward until the chin and cheek contour reaches strong edges along the tangents of the curves; and
a chin and cheeks contour determining portion stopping expanding the chin and cheeks contour when the chin and cheeks contour has reached the strong edges along the tangents of the curves.

48. The apparatus of claim 34, wherein the profile feature detecting portion comprises
a profile region detecting portion, a profile curve detecting portion,
a fiducial point detecting portion, and
an ear contour detecting portion.

49. The apparatus of claim 48, wherein the profile curve detecting portion detects the rightmost boundary of a face region in a user-specified bounding box defined from the frontal image as a profile curve.

50. The apparatus of claim 48, wherein the ear contour detecting portion comprises an ear contour by initializing the ear position by matching a curve template with the profile image and finding a more accurate ear boundary by deforming an initialized ear template using a contour following algorithm.

51. The apparatus of claim 30, wherein the generic model fitting unit comprises;
a 2D point converting portion converting feature curves detected in the images into 2D points corresponding to features defined in the 3D generic model using the length ratios of feature points on a facial feature curve of the 3D generic model; and
a mesh model fitting portion fitting the 3D generic model by 3-step radial based function (RBF)-based morphing based on the correspondences between the images features and the feature points of the 3D generic model.

52. The apparatus of claim 30, wherein the texture generating unit comprises:
an input image compensating portion compensating for different lightening conditions or color balance variations between cameras by performing color correction on the input images;
a frontal/profile texture generating portion generating frontal and profile textures by mapping the frontal and profile images onto a public UV plane based on the correspondence between 3D model vertices and projected 2D positions; and a texturing completing portion combining the frontal and profile textures and an artificial texture using a multi-resolution spline algorithm to complete texturing.

53. A non-transitory computer readable storage medium having embodied thereon computer readable code to control at least one processing element in a computer to implement a method for creating a 3D photorealistic head model, the method comprising:

detecting frontal and profile features in input frontal and profile images, the detecting frontal and profile features comprising detecting a face region, wherein the detecting a face region comprises initializing the largest skin-colored connected component as the face region, and wherein, when there are two largest connected components having similar sizes, the initializing includes selecting one of the two largest connected components that is closer to the center of the image as the face region;

detecting a profile region by classifying pixels into skin color pixels and non-skin color pixels and selecting the largest skin-colored connected component as the profile region;

generating a 3D head model by fitting a 3D genetic generic model using the detected face region and the detected profile region;

generating a realistic texture from the input frontal and profile images; and mapping the texture onto the 3D head model.

* * * * *

UNITED STATES PATENT AND TRADEMARK OFFICE
CERTIFICATE OF CORRECTION

| | |
|---|---|
| PATENT NO. | : 7,835,568 B2 |
| APPLICATION NO. | : 10/927241 |
| DATED | : November 16, 2010 |
| INVENTOR(S) | : In-Kyu Park et al. |

It is certified that error appears in the above-identified patent and that said Letters Patent is hereby corrected as shown below:

Column 32, Line 37 in Claim 35, after "image normalizing" delete "potion" and insert -- portion --, therefor.

Signed and Sealed this
First Day of February, 2011

David J. Kappos
*Director of the United States Patent and Trademark Office*